United States Patent
So et al.

(10) Patent No.: US 9,672,147 B2
(45) Date of Patent: Jun. 6, 2017

(54) MEMORY CONTROLLER, METHOD OF OPERATING MEMORY CONTROLLER, AND SYSTEM COMPRISING MEMORY CONTROLLER

(71) Applicants: SAMSUNG ELECTRONICS CO., LTD., Suwon-si, Gyeonggi-do (KR); KOREA ADVANCED INSTITUTE OF SCIENCE AND TECHNOLOGY, Yuseon-Gu, Daejeon (KR)

(72) Inventors: Hye Jeong So, Daejeon (KR); Sae Young Chung, Daejeon (KR); Jun Jin Kong, Yongin-si (KR); Chang Kyu Seol, Osan-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 286 days.

(21) Appl. No.: 14/014,511

(22) Filed: Aug. 30, 2013

(65) Prior Publication Data
US 2014/0068160 A1    Mar. 6, 2014

(30) Foreign Application Priority Data
Aug. 31, 2012 (KR) .................. 10-2012-0096267

(51) Int. Cl.
*G06F 3/00* (2006.01)
*G06F 12/02* (2006.01)
*G06F 3/06* (2006.01)

(52) U.S. Cl.
CPC ........ *G06F 12/0246* (2013.01); *G06F 3/0659* (2013.01); *G06F 2212/1036* (2013.01); *G06F 2212/7202* (2013.01); *G06F 2212/7204* (2013.01)

(58) Field of Classification Search
CPC ............. G06F 12/0246; G06F 12/0811; G06F 2012/7202; G06F 2012/7203; G06F 3/0659
See application file for complete search history.

(56) References Cited

U.S. PATENT DOCUMENTS

| | | | |
|---|---|---|---|
| 8,448,043 B2 | 5/2013 | Seo et al. | |
| 2009/0150599 A1* | 6/2009 | Bennett | 711/103 |
| 2012/0210082 A1* | 8/2012 | Sharon et al. | 711/154 |

FOREIGN PATENT DOCUMENTS

| | | |
|---|---|---|
| JP | 2007-035163 | 2/2007 |
| KR | 521155 | 10/2005 |
| KR | 2008-0046023 | 5/2008 |
| KR | 2011-0087036 | 8/2011 |

OTHER PUBLICATIONS

Wu, Yunnan, "Low Complexity Codes for Writing a Write-Once Memory Twice," ISIT 2010, Austin, Texas; USA., Jun. 13-18, 2010, pp. 1928-1932.

* cited by examiner

*Primary Examiner* — Ernest Unelas
(74) *Attorney, Agent, or Firm* — Volentine & Whitt, PLC

(57) ABSTRACT

A memory controller controls operation of a nonvolatile memory device comprising a memory area comprising a plurality of multi-level cells (MLCs). The memory controller receives an address of the memory area and data to be programmed to the memory area, analyzes access history information regarding the memory area based on the address, generates first mapping data corresponding to the data or second mapping data based on the data and previous mapping data that has been programmed to the MLCs according to a result of the analysis, and transmits a program command comprising one of the first mapping data and the second mapping data to the nonvolatile memory device.

20 Claims, 27 Drawing Sheets

| Address | Access History Information (AHI) |
|---------|----------------------------------|
| ADD1    | 0→1→2→1→2→ • • •                 |
| ADD2    | 1                                |
| ADD3    | 2                                |
| ⋮       | ⋮                                |
| ADDx    | 1                                |

FIG. 21

| Method of Coding | $R_1$ | $R_2$ | $R_1 + R_2$ |
|---|---|---|---|
| 1 | 1.9924 | 0.3333 | 2.3258 |
| 2 | 1.9690 | 0.5283 | 2.4973 |
| 3 | 1.1073 | 1.6356 | 2.7429 |
| 4 | 1.0000 | 1.5850 | 2.5850 |
| 5 | 0.9358 | 1.7233 | 2.6591 |
| 6 | 0.6667 | 1.8306 | 2.4973 |

_MEMORY CONTROLLER, METHOD OF OPERATING MEMORY CONTROLLER, AND SYSTEM COMPRISING MEMORY CONTROLLER_

CROSS-REFERENCE TO RELATED APPLICATIONS

This application claims priority under 35 U.S.C. §119 to Korean Patent Application No. 10-2012-0096267 filed on Aug. 31, 2012, the subject matter of which is hereby incorporated by reference in its entirety.

BACKGROUND OF THE INVENTION

The inventive concept relates generally to electronic memory technologies. More particularly, certain embodiments of the inventive concept relate to memory controllers and related techniques that can be used to manage data storage.

Nonvolatile memories are widely used in a variety of products such as mobile telephones, smart phones, digital cameras, and personal digital assistants (PDAs), to name but a few. Flash memory is a relatively popular form of nonvolatile memory due to attractive features such as relatively high storage capacity, relatively low power consumption, and an ability to withstand physical shock.

One shortcoming of flash memory is that it has limited endurance, meaning that its memory cells will wear out after a certain amount of use. To address this shortcoming, researchers have devoted considerable effort to developing techniques to reduce the effects of wear on the memory cells, such as wear leveling and other forms of data management.

SUMMARY OF THE INVENTION

According to one embodiment of the inventive concept, a method is provided for operating a memory controller configured to control operation of a nonvolatile memory device comprising a memory area comprising a plurality of multi-level cells (MLCs). The method comprises receiving an address of the memory area and data to be programmed to the memory area, analyzing access history information regarding the memory area based on the address, generating first mapping data corresponding to the data or second mapping data based on the data and previous mapping data that has been programmed to the MLCs according to a result of the analysis, and transmitting a program command comprising one of the first mapping data and the second mapping data to the nonvolatile memory device.

According to another embodiment of the inventive concept, a system comprises a nonvolatile memory device comprising a memory area comprising a plurality of MLCs and an access control circuit configured to control access to the memory area, and a memory controller configured to receive an address of the memory area and data to be programmed to the memory area, to analyze access history information for the memory area based on the address, to generate first mapping data corresponding to the data or second mapping data based on the data and previous mapping data that has been programmed to the MLCs based on a result of the analysis, and to transmit a program command including one of the first mapping data and the second mapping data to the nonvolatile memory device. Based on the program command, the access control circuit selectively performs programming the first mapping data to the MLCs, overwriting the previous mapping data with the second mapping data without erasing the previous mapping data from the MLCs, or erasing the previous mapping data and programming the first mapping data to the MLCs.

According to still another embodiment of the inventive concept, a memory controller is configured to control operation of a nonvolatile memory device comprising a memory area comprising a plurality of MLCs. The memory controller comprises a first interface configured to receive an address of the memory area and data to be programmed to the memory area, an analysis unit configured to analyze access history information regarding the memory area based on the address, a mapping data generator configured to generate first mapping data corresponding to the data or second mapping data based on the data and previous mapping data that has been programmed to the MLCs according to a result of the analysis, and a second interface configured to transmit a program command comprising one of the first mapping data and the second mapping data to the nonvolatile memory device. The first mapping data typically has a different number of bits than the second mapping data. The previous mapping data may be read from the MLCs based on the result of the analysis.

These and other embodiments of the inventive concept can potentially increase the endurance of a memory device by reducing the number of erasures performed on its memory cells.

BRIEF DESCRIPTION OF THE DRAWINGS

The drawings illustrate selected embodiments of the inventive concept. In the drawings, like reference numbers indicate like features.

FIG. 3 is a diagram of access history information stored by addresses in an access history table illustrated in FIG. 1.

FIG. 21 is a diagram of channel capacities for a 2-bit MLC in different embodiments of the inventive concept.

DETAILED DESCRIPTION

Embodiments of the inventive concept are described below with reference to the accompanying drawings. These embodiments are presented as teaching examples and should not be construed to limit the scope of the inventive concept.

The following description presents various methods for writing mapping data corresponding to new data to MLCs without erasing previous mapping data from the MLCs. These methods are typically performed, at least in part, by a memory controller associated with the MLCs, although they are not restricted to being performed by a memory controller.

Figure 1:
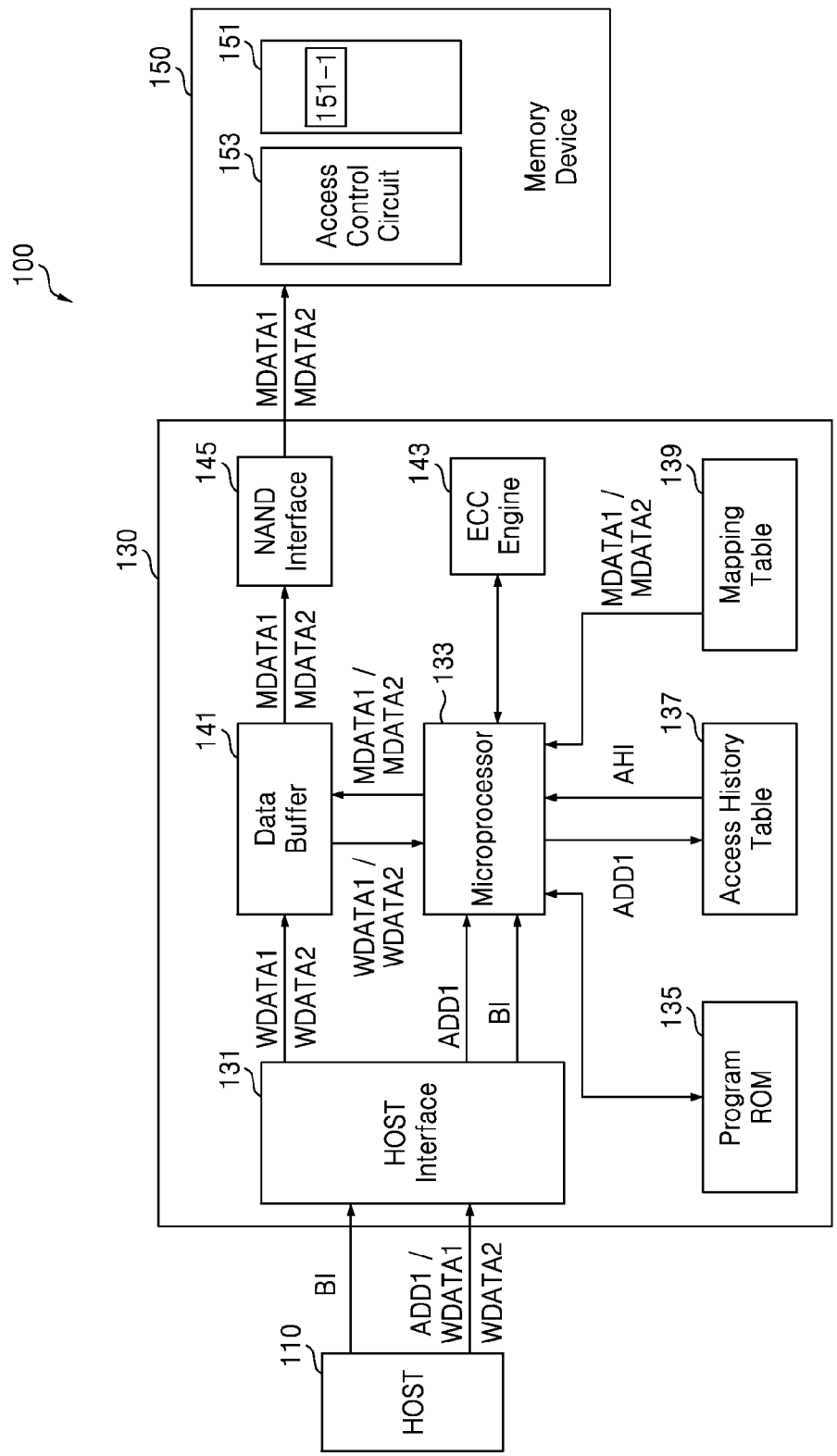
FIG. 1 is a block diagram of a system according to an embodiment of the inventive concept.

FIG. 1 is a block diagram of a system 100 according to an embodiment of the inventive concept.

Referring to FIG. 1, system 100 comprises a host 110, a memory controller 130, and a nonvolatile memory device 150.

System 100 can be implemented as a personal computer (PC), a server, or a portable device. The portable device may be, for instance, a laptop computer, a mobile telephone, a smart phone, a tablet PC, a PDA, an enterprise digital assistant (EDA), a digital still camera, a digital video camera, a portable multimedia player (PMP), a personal navigation device or portable navigation device (PND), a handheld game console, an e-book, or a universal serial bus (USB) flash drive.

Host 110 transmits various control signals to memory controller 130 to communicate with memory controller 130. For instance, host 110 may transmit an access request to memory controller 130 to access MLCs in a memory area 151-1 of a memory array 151 of nonvolatile memory device 150. The access request may include the control signals and/or data.

Here, an access may be a write operation for writing data to memory area 151-1, a read operation for reading data from memory area 151-1, an erase operation for erasing data from memory area 151-1, and an overwrite operation. The overwrite operation is to overwrite a memory area corresponding to an address with new data without performing an erase operation on the memory area after the program operation is performed on the memory area.

Memory controller 130 communicates with host 110 or nonvolatile memory device 150 in response to various control signals received from host 110. Host 110 is illustrated separated from memory controller 130 in FIG. 1, but memory controller 130 may be implemented within host 110 in other embodiments. In this case, host 110 may be implemented as a multi-core processor.

Memory controller 130, which controls the operations of nonvolatile memory device 150 including memory area 151-1, receives an address ADD1 of memory area 151-1 to be accessed and data WDATA1 or WDATA2 to be programmed to memory area 151-1. Features or components of memory controller 130 that receive the address may be referred to collectively as a first interface. It then analyzes access history information AHI regarding memory area 151-1 based on address ADD1. Features or components of memory controller 130 that perform this analysis can be referred to collectively as an analysis unit. Access history information AHI is stored in an access history table 137.

Based on a result of the analysis, memory controller 130 generates (or retrieves) first mapping data MDATA1 corresponding to first data WDATA1 and transmits a program command including address ADD1 and first mapping data MDATA1 to nonvolatile memory device 150. In addition, based on the analysis result, memory controller 130 reads previous mapping data programmed to memory area 151-1, generates (or retrieves) second mapping data MDATA2 based on second data WDATA2 and the previous mapping data, and transmits a program command including address ADD1 and second mapping data MDATA2 to nonvolatile memory device 150. Here, the number of bits in first data WDATA1 may be different from the number of bits in second data WDATA2. Features or components of memory controller 130 that generate the mapping data can be referred to collectively as a mapping data generator. Features or components of memory controller 130 that transmit the mapping data to the nonvolatile memory device can be referred to as a second interface.

Based on the program command, an access control circuit 153 in nonvolatile memory device 150 programs first mapping data MDATA1 to the MLCs, overwrites the MLCs with second mapping data MDATA2 without erasing the previous mapping data from the MLCs, or programs first mapping data MDATA1 to the MLCs after erasing the previous mapping data.

Memory controller 130 comprises a host interface 131, a microprocessor 133, a program read-only memory (ROM) 135, access history table 137, a mapping table 139, a data buffer 141, an error correction code (ECC) engine 143, and a NAND interface 145. Tables 137 and 139 are stored in nonvolatile memory device 150.

Host interface 131 transmits address ADD1 from host 110 to microprocessor 133 and transmits data WDATA1 or WDATA2 from host 110 to data buffer 141. Microprocessor 133 controls the operations of at least one of components 131, 135, 137, 139, 141, 143, and 145.

Program ROM 135 may store programs used for the operations of memory controller 130 and programs related with at least one of various coding methods according to some embodiments of the inventive concept. The programs stored in program ROM 135 may be executed according to the control of microprocessor 133.

FIG. 3 is a diagram of access history information AHI stored by addresses in access history table 137 illustrated in FIG. 1.

Referring to FIG. 3, access history table 137 stores access history information AHI by addresses ADD1 through ADDx, where "x" is a natural number. For instance, where data or mapping data is never been programmed to memory area 151-1 corresponding to address ADD1, access history information AHI is set to "0" according to the control of microprocessor 133.

Where data or mapping data is programmed for the first time in memory area 151-1 corresponding to address ADD1 using a coding method according to some embodiments of the inventive concept after memory area 151-1 is erased, access history information AHI is changed from "0" to "1" according to the control of microprocessor 133.

Thereafter, where new data or new mapping data is programmed for the second time to memory area 151-1, access history information AHI is changed from "1" to "2" according to the control of microprocessor 133. Thereafter, where new data or new mapping data is programmed for the first time to memory area 151-1 after memory area 151-1 is erased, access history information AHI is changed from "2" to "1" according to the control of microprocessor 133. A procedure for programming first mapping data MDATA1 corresponding to first data WDATA1 to memory area 151-1 will be described with reference to FIG. 1 below.

Microprocessor 133 reads access history information AHI from access history table 137 based on address ADD1. Microprocessor 133 reads first data WDATA1 to be stored in memory area 151-1 corresponding to address ADD1 from data buffer 141. Microprocessor 133 retrieves first mapping data MDATA1 corresponding to first data WDATA1 from mapping table 139 based on address ADD1 and transmits a program command including address ADD1 and first mapping data MDATA1 to nonvolatile memory device 150 through data buffer 141 and NAND interface 145. Mapping table 139 stores a plurality of mapping data used to execute a coding method according to some embodiments of the inventive concept.

Nonvolatile memory device 150 programs first mapping data MDATA1 to memory area 151-1 corresponding to address ADD1 according to the program command. A procedure for overwriting memory area 151-1 corresponding to address ADD1 with second mapping data MDATA2 corresponding to second data WDATA2 will be described in detail with reference to FIGS. 5 through 20 later. Mapping data may be referred to as a codeword.

Figure 2:
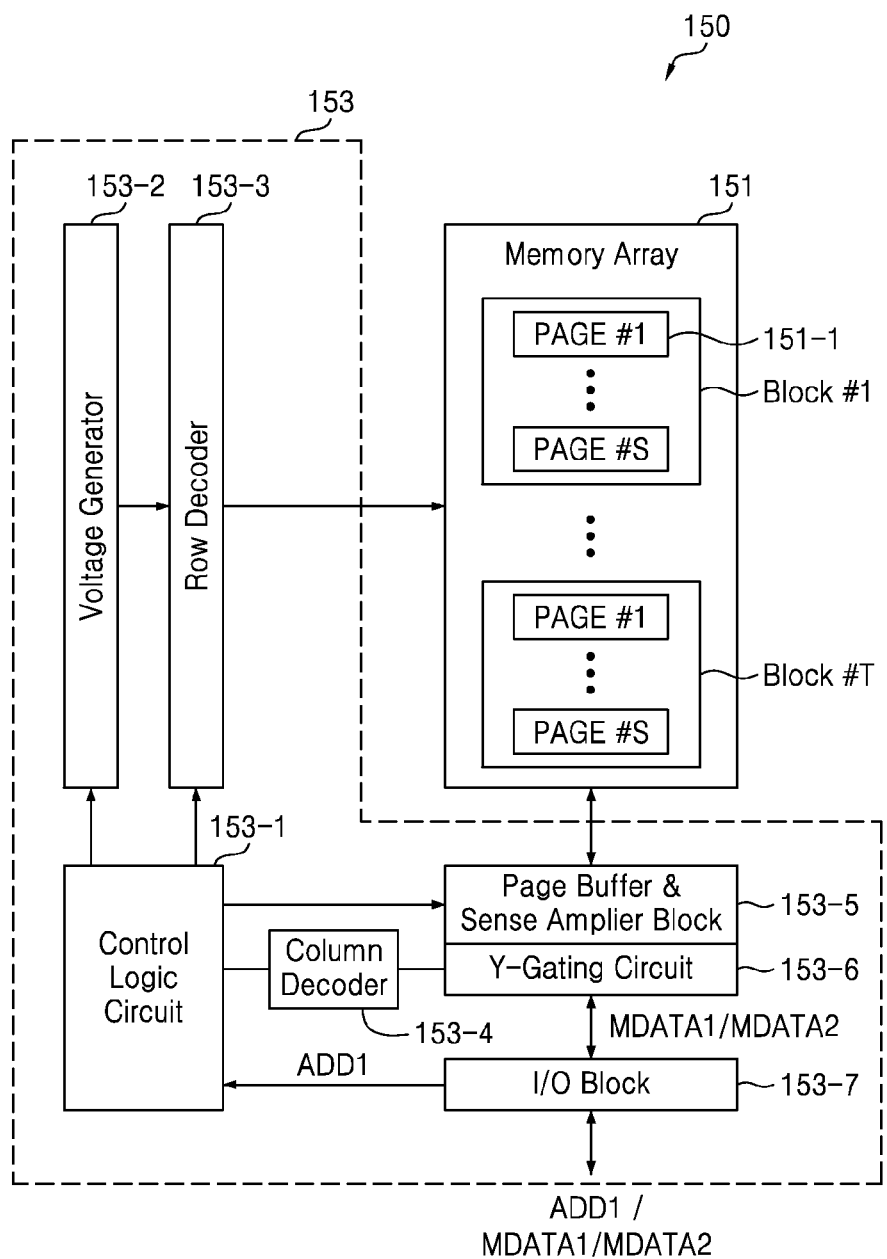
FIG. 2 is a block diagram of a nonvolatile memory device illustrated in FIG. 1.

FIG. 2 is a block diagram of nonvolatile memory device 150 illustrated in FIG. 1.

Referring to FIGS. 1 and 2, nonvolatile memory device 150 comprises memory array 151 and access control circuit 153. Memory array 151 may be implemented in two or three dimensions.

Memory array 151 comprises memory blocks BLOCK#1 through BLOCK#T, where T is a natural number. Each of memory blocks BLOCK#1 through BLOCK#T comprises pages PAGE#1 through PAGE#S, where S is a natural number. Each of pages PAGE#1 through PAGE#S comprises MLCs. Program and read operations are performed in units of pages and erase operations are performed in units of memory blocks.

Access control circuit 153 controls access to memory array 151, for example, program operations, read operations, erase operations, or overwrite operations, according to the control of memory controller 130. Access control circuit 153 comprises a control logic circuit 153-1, a voltage generator 153-2, a row decoder 153-3, a column decoder 153-4, a page buffer and sense amplifier block 153-5, a Y-gating circuit 153-6, and an input/output (I/O) block 153-7.

Control logic circuit 153-1 controls operations of components 153-2, 153-3, 153-4, and 153-5. Control logic circuit 153-1 generates a control signal (e.g., including a row address) for controlling row decoder 153-3 and a control signal (e.g., including a column address) for controlling column decoder 153-4 according to address ADD1 received through I/O block 153-7.

According to the control of control logic circuit 153-1, voltage generator 153-2 generates voltages used for the access. According to the control of control logic circuit 153-1, row decoder 153-3 applies the voltage generated by voltage generator 153-2 to word lines and control lines implemented in memory array 151. According to the control of control logic circuit 153-1, column decoder 153-4 generates selection signals for selecting bit lines implemented in memory array 151.

During the program operation, page buffer and sense amplifier block 153-5 transmits program data to a memory area, e.g., a page selected by row decoder 153-3 and column decoder 153-4. During the read operation, page buffer and sense amplifier block 153-5 senses and amplifies read data output from a memory area, e.g., a page selected by row decoder 153-3 and column decoder 153-4.

Y-gating circuit 153-6 controls the connection between page buffer and sense amplifier block 153-5 and I/O block 153-7 based on the selection signals generated by column decoder 153-4. Therefore, during the program operation, first mapping data MDATA1 or second mapping data MDATA2 received through I/O block 153-7 is programmed to memory area 151-1 corresponding to address ADD1 according to the control of access control circuit 153.

According to a program command output from memory controller 130, access control circuit 153 performs one three program operations. Microprocessor 133 may determine a type of the program command according to access history information AHI corresponding to an address. A first program operation is referred to as first writing where access history information AHI corresponding to the address is "0", and first mapping data MDATA1 corresponding to first data WDATA1 is programmed to a memory area corresponding to the address. A second program operation is referred to as second writing where access history information AHI corresponding to the address is "1", and mapping data (e.g., first mapping data MDATA1) that has been programmed to the memory area is overwritten with second mapping data MDATA2 corresponding to second data WDATA2 in the memory area without being erased. A third program operation is referred to as normal writing where access history information AHI corresponding to the address is "2", and mapping data (e.g., second mapping data MDATA2) that has been programmed to the memory area is erased and then first mapping data MDATA1 corresponding to first data WDATA1 is programmed to the memory area.

Figure 4:
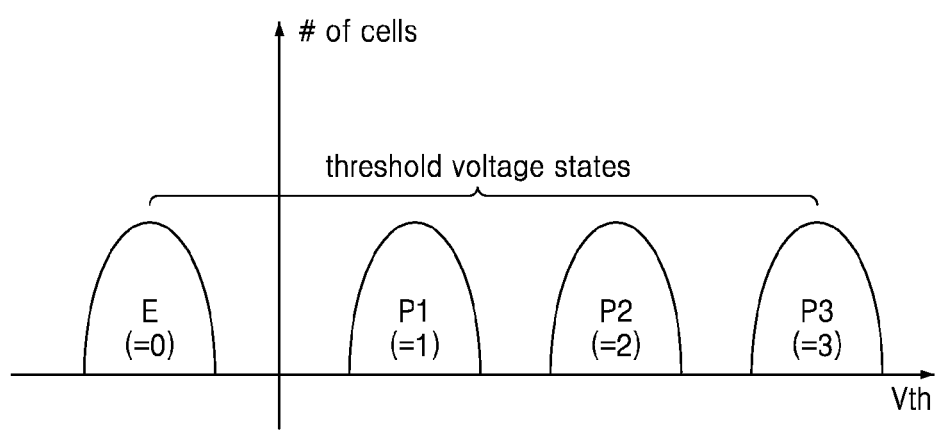
FIG. 4 is a diagram illustrating threshold voltage states of a 2-bit multi-level cell (MLC).

FIG. 4 is a diagram of the threshold voltage states of a 2-bit MLC. In other words, FIG. 4 shows the distributions of threshold voltages of MLCs. Where the MLCs are m-bit MLCs, there are $2^m$ threshold voltage states (or simply "states"). Where $q=2^m$, each MLC has states 0, 1, 2, ..., and (q−1). Accordingly, 2-bit MLCs have four states, i.e., state 0, state 1, state 2, and state 3, according to threshold voltages.

As illustrated in FIG. 4, it is assumed that an MLC has an erased state E or state 0 according to data of "0", a P1 state or state 1 according to data of "1", a P2 state or state 2 according to data of "2", and a P3 state or state 3 according to data of "3". Therefore, "0" means data of 0 or state 0 and "3" means data of 3 or state 3. For instance, in a binary system, data of 0 may indicate "00", data of 1 may indicate "01", data of 2 may indicate "10", and data of 3 may indicate "11".

FIGS. 5 through 20 are conceptual diagrams for explaining data mapping methods according to different embodiments of the inventive concept. $R_1$ and $R_2$ denote a channel capacity, i.e., a theoretical limit on the amount of data that can be stored in an MLC. Here, $R_1$ denotes a channel capacity where data is programmed to the MLC for the first time, i.e., in first writing and $R_2$ denotes the channel capacity where data is programmed to the MLC for the second time without erasing the MLC, i.e., in the second writing.

Six mapping algorithms or coding methods applicable to an m-bit MLC will be described in detail with reference to FIGS. 5 through 20. The mapping algorithms or coding methods are based on dirty paper coding (DPC) theory.

Figure 5:
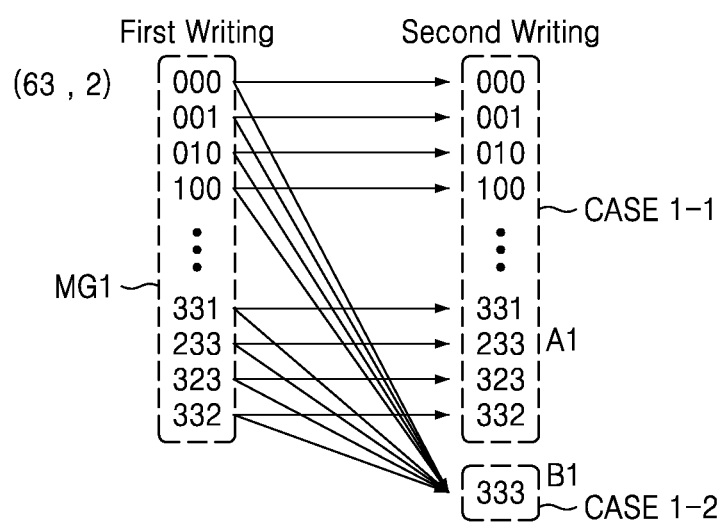
FIG. 5 is a conceptual diagram for explaining a data mapping method according to an embodiment of the inventive concept.

FIG. 5 is a diagram for explaining a first mapping algorithm or coding method. In the description that follows, channel capacities $R_1$ and $R_2$ are determined by the following equation (1).

$$R_1 = \frac{1}{n}\log_2(q^n - 1) \quad (1)$$
$$R_2 = \frac{1}{n}\log_2 2 = \frac{1}{n}$$

In equation (1), "n" represents the number of MLCs for storing mapping data (or a codeword), that is, the length of the codeword, and q (=2m) represents the number of states.

The number of mapping data groups or the number of cases according to the first mapping algorithm may be expressed by the following equation (2).

$$<q^n-1, 2> \quad (2)$$

In equation (2), the first term, i.e., "$q^n-1$" represents the number of mapping data in a first mapping data group MG1 to be used in the first writing and the second term, i.e., "2" represents the number of second mapping data groups (or cases) to be used in the second writing. At this time, each of the second mapping data groups includes at least one mapping data.

As shown in FIG. 5, state (q−1) of each MLC is excluded from the first mapping data group MG1. For instance, where n=3 and q=4, (q−1)(q−1)(q−1), i.e., "333" is excluded from the first mapping data group MG1. Where it is assumed that the erased state is 0 and the programmed state is 1, it is possible to change data of 0 to data of 1 but it is impossible to change data of 1 to data of 0 in the second writing, and therefore, "333" is excluded from the first mapping data group MG1.

The first writing in which first data WDATA1 is programmed to memory area 151-1 corresponding to address ADD1 and the second writing in which second data WDATA2 is programmed to memory area 151-1 corresponding to address ADD1 will be described in detail with reference to FIGS. 1 through 5. For convenience in the description, it is assumed that n=3 and q=4 and <63, 2> is determined according to equation (1).

Where the first writing is performed on memory area 151-1 including three 2-bit MLCs, microprocessor 133 retrieves first mapping data MDATA1 corresponding to first data WDATA1 among 63 mapping data "000" through "332" in the first mapping data group MG1 from mapping table 139 based on access history information AHI (=0) corresponding to address ADD1. Microprocessor 133 transmits a first program command including address ADD1 and the retrieved first mapping data MDATA1 to access control circuit 153 of nonvolatile memory device 150 through data buffer 141 and NAND interface 145. At this time, microprocessor 133 changes access history information AHI corresponding to address ADD1 from 0 to 1.

Based on the first program command, access control circuit 153 programs first mapping data MDATA1 to memory area 151-1 corresponding to address ADD1. First data WDATA1 may be 5-bit data where the number of mapping data in the first mapping data group MG1 is 63 and second data WDATA2 may be 1-bit data where the number of second mapping data groups is 2.

Where the second writing is performed on memory area 151-1 including three 2-bit MLCs, microprocessor 133 reads first mapping data MDATA1 from memory area 151-1 corresponding to address ADD1 in nonvolatile memory device 150 based on access history information AHI (=1) corresponding to address ADD1.

Microprocessor 133 determines whether to maintain first mapping data MDATA1 or select second mapping data MDATA2 based on second data WDATA2 and first mapping data MDATA1. For instance, where second data WDATA2 is a first message A1, e.g., 0 as in a case 1-1, microprocessor 133 determines to maintain first mapping data MDATA1. Here, the message is data that includes at least one bit. On the other hand, where second data WDATA2 is a second message B1, e.g., 1 as in a case 1-2, microprocessor 133 transmits a second program command including address ADD1 and second mapping data MDATA2 (=333) to access control circuit 153 of nonvolatile memory device 150 through data buffer 141 and NAND interface 145 in order to change first mapping data MDATA1 to second mapping data MDATA2 (=333). At this time, microprocessor 133 may change access history information AHI corresponding to address ADD1 from 1 to 2.

Based on the second program command, access control circuit 153 overwrites memory area 151-1 corresponding to address ADD1 with second mapping data MDATA2 (=333). In case 1-1, first mapping data MDATA1 programmed to memory area 151-1 in the first writing is maintained according to second data WDATA2, i.e., first message A1. However, in case 1-2, first mapping data MDATA1 programmed to memory area 151-1 in the first writing is replaced with second mapping data MDATA2 according to second data WDATA2, i.e., second message B1. At this time, second mapping data MDATA2 is "(q−1)(q−1)(q−1)", i.e., "333". Therefore, state of each MLC shifts to the highest state.

Where the normal writing is performed on memory area 151-1 that includes three 2-bit MLCs that have been erased, microprocessor 133 retrieves first mapping data MDATA1 corresponding to first data WDATA1 among the 63 mapping data "000" through "332" from mapping table 139 based on access history information AHI (=2) corresponding to address ADD1 and transmits a third program command including address ADD1 and the retrieved first mapping data MDATA1 to access control circuit 153 of nonvolatile memory device 150 through data buffer 141 and NAND interface 145. At this time, microprocessor 133 may change access history information AHI corresponding to address ADD1 from 2 to 1.

Based on the third program command, access control circuit 153 erases second mapping data MDATA2 from memory area 151-1 corresponding to address ADD1 and programs new first mapping data MDATA1 to memory area 151-1. Access history information AHI may be changed to a new value under the control of microprocessor 133 after a program operation is completed. The completion or incompletion of the program operation may be determined based on a result of communication, e.g., handshaking, between microprocessor 133 and access control circuit 153.

Figure 6:
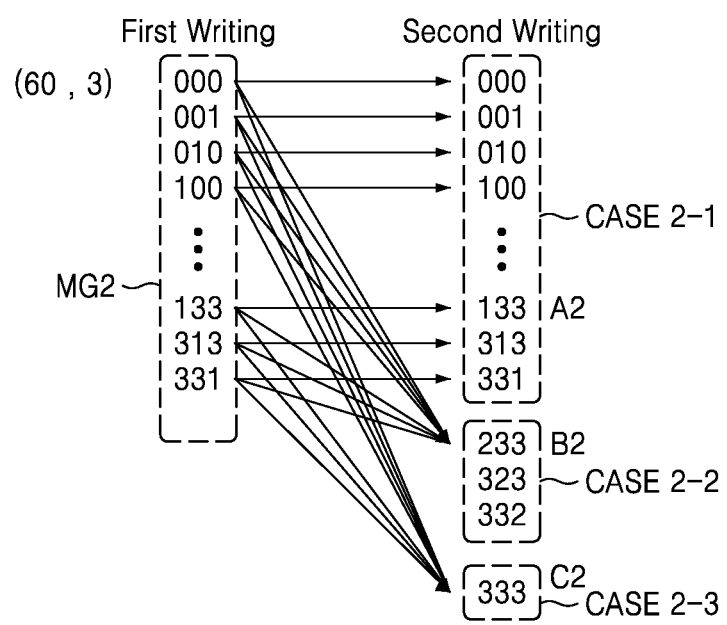
FIG. 6 is a conceptual diagram for explaining a data mapping method according to another embodiment of the inventive concept.
Figure 7:
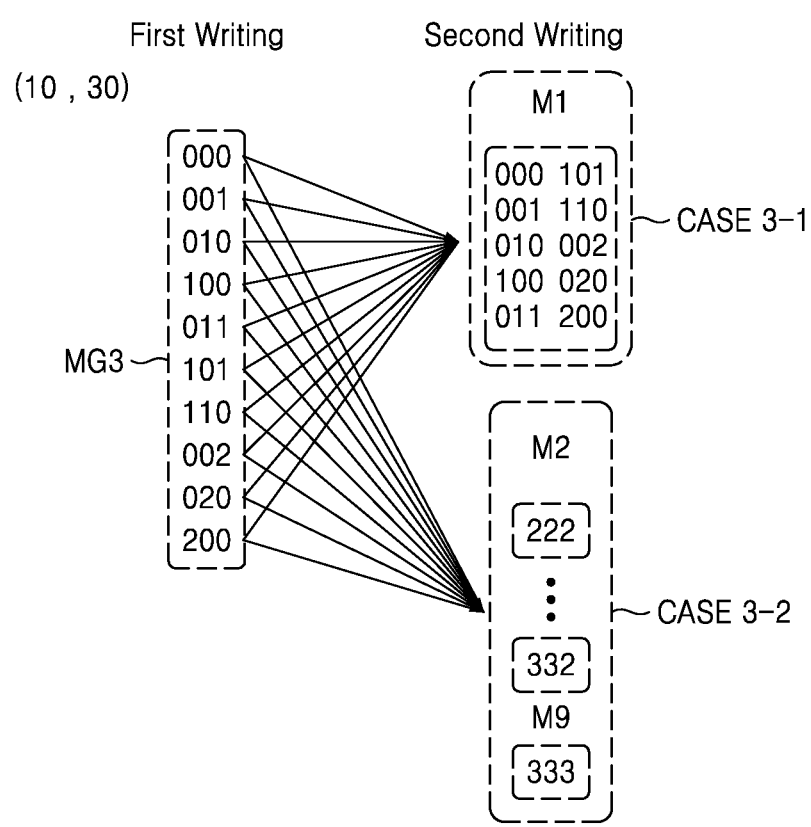
FIG. 7 is a conceptual diagram for explaining a data mapping method according to another embodiment of the inventive concept.

FIG. 6 is a diagram for explaining a second mapping algorithm or coding method. Channel capacities $R_1$ and $R_2$ are determined by the following equation (3).

$$R_1 = \frac{1}{n}\log_2\{q^n - (n+1)\} \quad (3)$$
$$R_2 = \frac{1}{n}\log_2 3$$

The number of cases according to the second mapping algorithm may be expressed by the following equation (4).

$$<q^n-(n+1),3> \quad (4)$$

In equation (4), the first term, i.e., "$q^n-(n+1)$" represents the number of mapping data in a first mapping data group MG2 to be used in the first writing, and the second term, i.e., "3" represents the number of second mapping data groups (or cases) to be used in the second writing.

Here, (n+1) mapping data is excluded from $q^n$ mapping data to form the first mapping data group MG2. State (q-1) of each MLC, e.g., (q-1)(q-1)(q-1), i.e., "333" where n=3 and q=4, is excluded from the first mapping data group MG2. In addition, states in which only one MLC has state (q-2) and the remaining MLCs have state (q-1), e.g., (q-2)(q-1)(q-1), (q-1)(q-2)(q-1), and (q-1)(q-1)(q-2), i.e., "233", "323", and "332" where n=3 and q=4, are excluded from the first mapping data group MG2.

The first writing in which first data WDATA1 is programmed to memory area 151-1 corresponding to address ADD1, the second writing in which memory area 151-1 corresponding to address ADD1 is overwritten with second data WDATA2, and the normal writing will be described in detail with reference to FIGS. 1 through 4 and FIG. 6. Where it is assumed that n=3 and q=4 and <60, 3> is determined according to equation (4).

Where the first writing is performed on memory area 151-1 including three 2-bit MLCs, microprocessor 133 retrieves first mapping data MDATA1 corresponding to first data WDATA1 among 60 mapping data "000" through "331" from mapping table 139 based on access history information AHI (=0) corresponding to address ADD1 and transmits a first program command including address ADD1 and the retrieved first mapping data MDATA1 to access control circuit 153 of nonvolatile memory device 150 through data buffer 141 and NAND interface 145. At this time, microprocessor 133 may change access history information AHI corresponding to address ADD1 from 0 to 1. Based on the first program command, access control circuit 153 programs first mapping data MDATA1 to memory area 151-1 corresponding to address ADD1.

Where the second writing is performed on memory area 151-1 including three 2-bit MLCs, microprocessor 133 reads first mapping data MDATA1 from memory area 151-1 corresponding to address ADD1 in nonvolatile memory device 150 based on access history information AHI (=1) corresponding to address ADD1.

Microprocessor 133 determines whether to maintain first mapping data MDATA1 or output second mapping data MDATA2 based on second data WDATA2 and first mapping data MDATA1. For instance, where second data WDATA2 is a first message A2, microprocessor 133 determines to maintain first mapping data MDATA1 that has been programmed to memory area 151-1. On the other hand, where second data WDATA2 is a second message B2 or a third message C2, microprocessor 133 selects second mapping data MDATA2 and transmits a second program command including address ADD1 and second mapping data MDATA2 to access control circuit 153 of nonvolatile memory device 150 through data buffer 141 and NAND interface 145. At this time, microprocessor 133 may change access history information AHI corresponding to address ADD1 from 1 to 2. Based on the second program command, access control circuit 153 overwrites memory area 151-1 corresponding to address ADD1 with second mapping data MDATA2.

In a case 2-1, where second data WDATA2 is first message A2, first mapping data MDATA1 programmed to memory area 151-1 in the first writing is maintained. In a case 2-2, where second data WDATA2 is second message B2, first mapping data MDATA1 programmed to memory area 151-1 in the first writing is replaced with second mapping data MDATA2. At this time, second mapping data MDATA2 is one of the states in which only one of the three MLCs has state (q-2) and the remaining MLCs have state (q-1), e.g., (q-2)(q-1)(q-1), (q-1)(q-2)(q-1), and (q-1)(q-1)(q-2), i.e., "233", "323", and "332". On the other hand, in a case 2-3, where second data WDATA2 is third message C2, first mapping data MDATA1 programmed to memory area 151-1 in the first writing is replaced with second mapping data MDATA2. At this time, second mapping data MDATA2 is a state in which all three MLCs have state (q-1), e.g., (q-1)(q-1)(q-1), i.e., "333".

Where the normal writing is performed on memory area 151-1 comprising three 2-bit MLCs that have been erased, microprocessor 133 retrieves first mapping data MDATA1 corresponding to first data WDATA1 among the 60 mapping data "000" through "331" from mapping table 139 based on access history information AHI (=2) corresponding to address ADD1 and transmits a third program command including address ADD1 and the retrieved first mapping data MDATA1 to access control circuit 153 of nonvolatile memory device 150 through data buffer 141 and NAND interface 145. At this time, microprocessor 133 changes access history information AHI corresponding to address ADD1 from 2 to 1. Then, based on the third program command, access control circuit 153 erases second mapping data MDATA2 from memory area 151-1 corresponding to address ADD1 and programs new first mapping data MDATA1 to memory area 151-1.

FIGS. 7 through 13 are diagrams for explaining a third mapping algorithm or coding method. Channel capacities $R_1$ and $R_2$ are determined by the following equation (5).

$$R_1 = \frac{1}{n}\log_2(2^n + n - 1) \quad (5)$$

-continued $$R_2 = \frac{1}{n}\log_2\{q(q-1)^{n-1} - (q-2)^{n-1}\} (n \geq 4)$$

$$R_1 = \frac{1}{n}\log_2(2^n + n - 1)$$

$$R_2 = \frac{1}{n}\log_2\{q(q-1)^{n-1} - (q-2)^{n-1} - 2\} (n = 2 \text{ or } 3)$$

The number of cases according to the third mapping algorithm may be expressed by the following equation (6).

$<2^n+n-1, q(q-1)^{n-1}-(q-2)^{n-1}>$ where $n \geq 4$ $<2^n+n-1, q(q-1)^{n-1}-(q-2)^{n-1}-2>$ where $n=2$ or $3$     (6)

In equation (6), the first term "$2^n+n-1$" represents the number of mapping data in a first mapping data group MG3 to be used in the first writing; the second term "$q(q-1)^{n-1}-(q-2)^{n-1}$", represents the number of second mapping data groups (or cases) to be used in the second writing where $n \geq 4$; and the second term "$q(q-1)^{n-1}-(q-2)^{n-1}-2$" represents the number of second mapping data groups (or cases) to be used in the second writing where $n=2$ or $3$ because cases overlap with each other due to a grouping characteristic.

The first mapping data group MG3 includes mapping data indicating that each of "n" MLCs has state 0, mapping data indicating that (n−1) or less MLCs have state 1 and the remaining MLCs have state 0, and mapping data indicating that only one MLC has state 2 and the remaining MLCs have state 0. Where it is assumed that n=3 and q=4 and <10, 30> is determined according to equation (6).

The first mapping data group MG3 comprises 10 mapping data, i.e., "000" indicating that each of "n" MLCs has state 0, "001", "010", "100", "011", "101", and "110" indicating that (n−1) or less MLCs have state 1 and the remaining MLCs have state 0, and "002", "020", and "200" indicating that only one MLC has state 2 and the remaining MLCs have state 0.

The second writing in which second data WDATA2 is programmed to memory area 151-1 corresponding to address ADD1 will be described in detail with reference to FIGS. 7 through 13. In a case 3-1 illustrated in FIG. 7, first mapping data MDATA1 that has been programmed to memory area 151-1 in the first writing is maintained according to second data WDATA2.

In a case 3-2, first mapping data MDATA1 that has been programmed to memory area 151-1 in the first writing is replaced with second mapping data MDATA2 according to second data WDATA2. In case 3-2, a second mapping data group includes mapping data indicating that each MLC does have neither state 0 nor state 1 but has a state of at least 2 and at most (q−1). For instance, mapping data "222" . . . "332", and "333" in second mapping data groups M2 through M9 never include state 0 and state 1. According to a message indicated by second data WDATA2, one of the eight mapping data "222" . . . "332", and "333" may be selected as second mapping data MDATA2.

Figure 8:
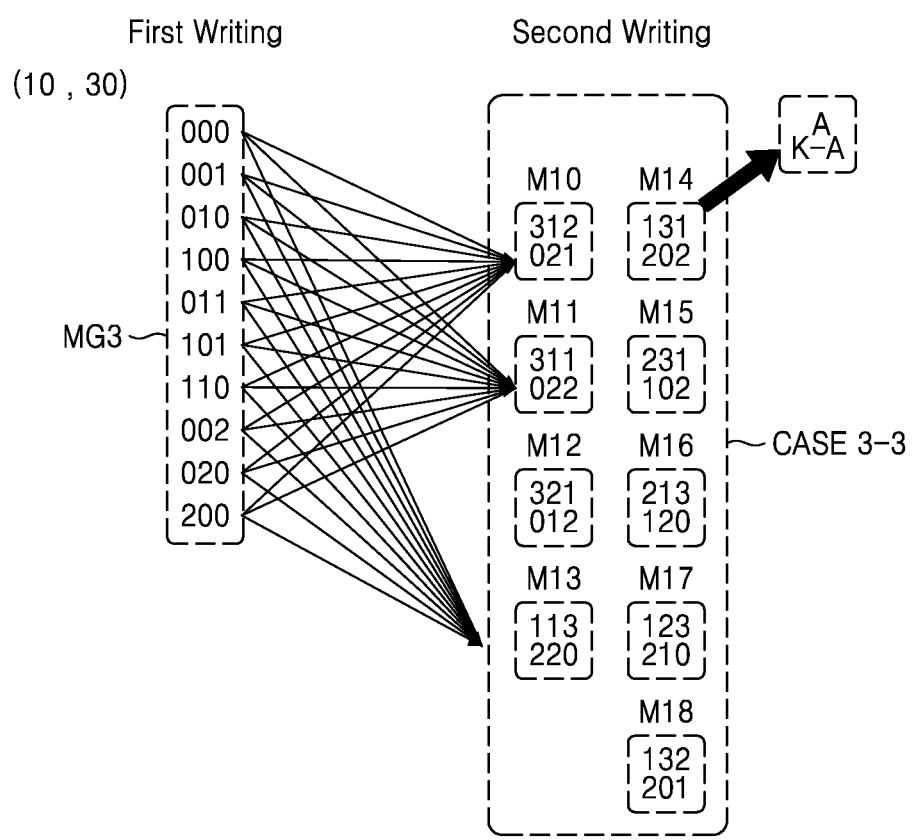
FIG. 8 is a conceptual diagram for explaining a data mapping method according to another embodiment of the inventive concept.

In a case 3-3 illustrated in FIG. 8, mapping data in second mapping data groups M10 through M18 does not include state 0 and includes at least one state 1. A plurality of mapping data in each of the second mapping data groups M10 through M18 correspond to a mapping data set or a codeword set indicating the same message. Where the second mapping data groups M10 through M18 include mapping data A and (K−A) in pairs, mapping data K is composed of only one state between state 2 and state (q−1) and the state is the highest state among the states of MLCs in mapping data A. For instance, where mapping data A is "312", mapping data K is "333", and therefore, the mapping data (K−A) is 333−312=021. Where mapping data A is "131", the mapping data (K−A) is "202".

According to the message of second data WDATA2, one of the mapping data "312" and "021" in the second mapping data group M10 may be selected as second mapping data MDATA2. However, where mapping data A generated in case 3-3 illustrated in FIG. 8 overlaps with mapping data A generated in a case 3-5 illustrated in FIG. 10 and a case 3-6 illustrated in FIG. 11, mapping data A is defined to belong to second mapping data groups in cases 3-5 and 3-6 respectively illustrated in FIGS. 10 and 11.

Figure 9:
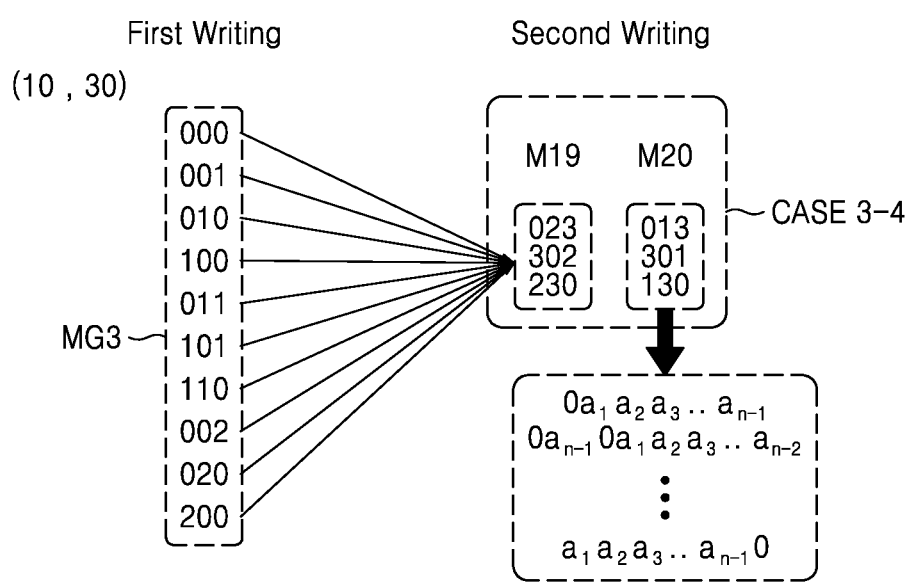
FIG. 9 is a conceptual diagram for explaining a data mapping method according to another embodiment of the inventive concept.

In a case 3-4 illustrated in FIG. 9, mapping data (or codeword) in second mapping data groups M19 and M20 includes only one state 0 and at least one of the remaining states is state (q−1). A plurality of mapping data in each of the second mapping data groups M19 and M20 correspond to a mapping data set or a codeword set indicating the same message. For instance, according to the message of second data WDATA2, one of the mapping data "023", "302", and "230" in the second mapping data group M19 may be selected as second mapping data MDATA2.

The mapping data "023", "302", and "230" are generated using a circular shift operation. In other words, where the mapping data "023" is bitwise shifted in a circle, the mapping data "302" is generated. However, mapping data that corresponds to case 3-5 illustrated in FIG. 10 and satisfies the following conditions is excluded from case 3-4. In detail, where the mapping data includes one state 0 and state (q−1) as the remaining states, for example, where the mapping data is "033", "303", or "330", the mapping data is excluded from case 3-4.

Figure 10:
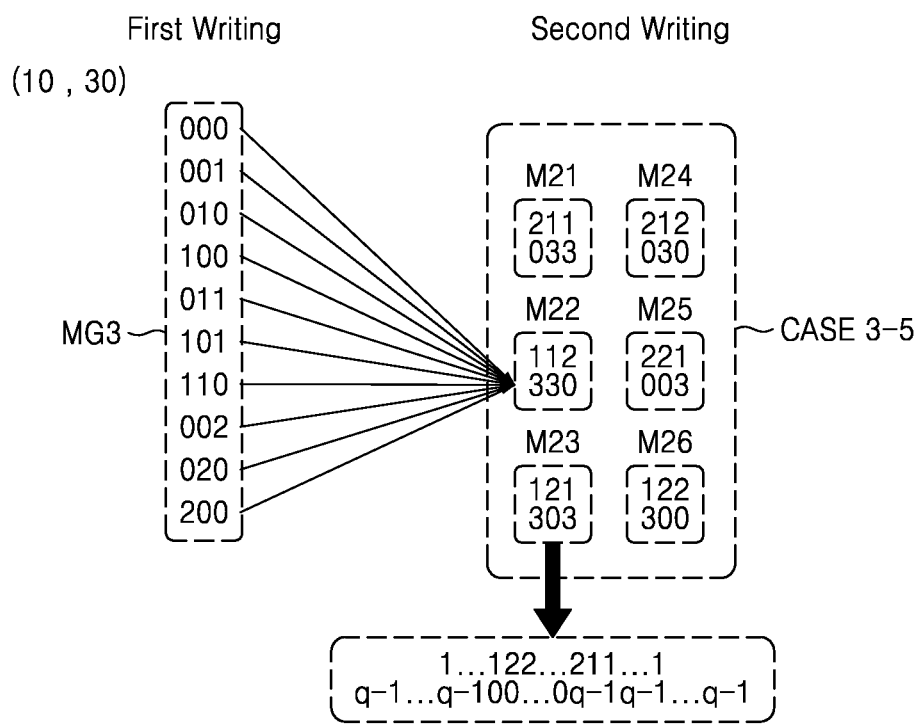
FIG. 10 is a conceptual diagram for explaining a data mapping method according to another embodiment of the inventive concept.

In case 3-5 illustrated in FIG. 10, mapping data A in second mapping data groups M21 through M26 includes state 1 and state 2 only. A plurality of mapping data A and B in each of the second mapping data groups M21 through M26 correspond to a mapping data set or a codeword set indicating the same message. Where 1 and 2 are replaced with (q−1) and 0, respectively, in mapping data A in the second mapping data groups M21 through M26, mapping data B is generated. For instance, where q=4 and 2 and 1 are replaced with 0 and 3, respectively, in a mapping data A of "211", a mapping data B of "033" is generated. In another instance, where 1 and 2 are replaced with 3 and 0, respectively, in a mapping data of "212", a mapping data of "030" is generated.

Figure 11:
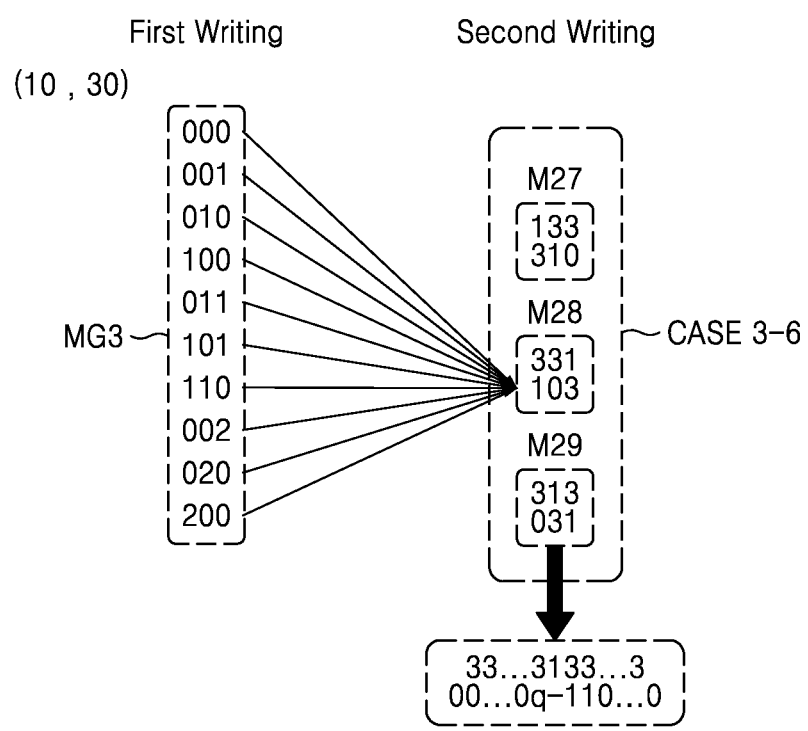
FIG. 11 is a conceptual diagram for explaining a data mapping method according to another embodiment of the inventive concept.

In case 3-6 illustrated in FIG. 11, there is only one state 1 and the remaining states are state 3 in mapping data "133", "331", and "313" in second mapping data groups M27 through M29. Where 1 is replaced with (q−1), a second value of 3 is replaced with 1, and the remaining value is replaced with 0 in mapping data A in the second mapping data groups M27 through M29, mapping data B is generated. A plurality of mapping data in each of the second mapping data groups M27 through M29 correspond to a mapping data set or a codeword set indicating the same message.

For instance, where q=4 and a first value of 1, a second value of 3, and a third value of 3 in a mapping data of "133" are replaced with 3, 1, and 0, respectively, a mapping data of "310" is generated. However, in a case of a mapping data of "331", the circular shift operation is used as well as the rule applied to the mapping data of "133". In other words, in the mapping data of "331" a third value of 1 is replaced with 3, a first value of 3 is replaced with 1, and a second value of 3 is replaced with 0, so that a mapping data of "103" making a pair with the mapping data of "331" is generated.

Also, in the mapping data of "313" a second value of 1 is replaced with 3, a third value of 3 is replaced with 1, and a first value of 3 is replaced with 0, so that a mapping data of "031" making a pair with the mapping data of "313" is generated.

Where n=3, mapping data in case 3-4 illustrated in FIG. 9 may overlap with mapping data in case 3-6 illustrated in FIG. 11. In this case, case 3-6 is applied for the overlapping mapping data. Where n=2, because "n" is so small, mapping data in case 3-6 illustrated in FIG. 11 is combined with mapping data in a case 3-7 illustrated in FIG. 12 to form a mapping data set. For instance, where q=4, mapping data of "13" and "31" in case 3-6 may form a mapping data set indicating the same message together with a mapping data of "11" in case 3-7. Therefore, where n=2 or 3, the number of second mapping data groups (or the number of cases) to be used in the second writing is reduced by 2 and is expressed by $q(q-1)^{n-1}-(q-2)^{n-1}-2$ as shown in equation (6).

Figure 12:
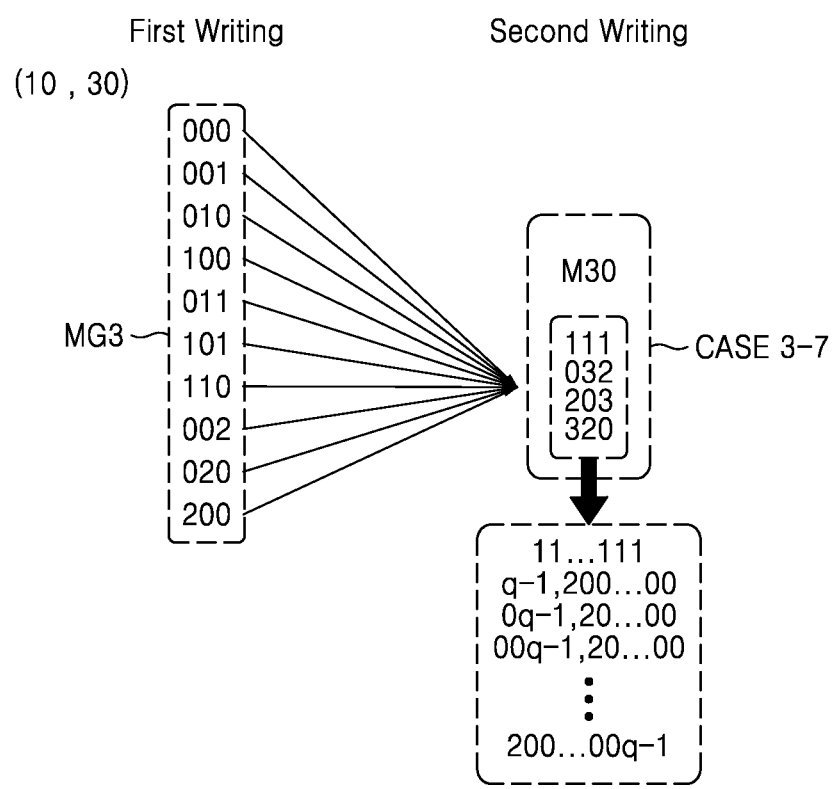
FIG. 12 is a conceptual diagram for explaining a data mapping method according to another embodiment of the inventive concept.

In case 3-7 illustrated in FIG. 12, a second mapping data group M30 includes mapping data (i) including only a value of 1 such as "111"; mapping data (ii) such as "032" including one (q−1), 2 following (q−1), and 0 following value of 2; and mapping data generated by circularly shifting the mapping data (ii). In case 3-7, a plurality of mapping data in the second mapping data group M30 correspond to a mapping data set or a codeword set indicating the same message. Where n=2, the second mapping data group M30 includes mapping data of "11", "31", and "13".

Figure 13:
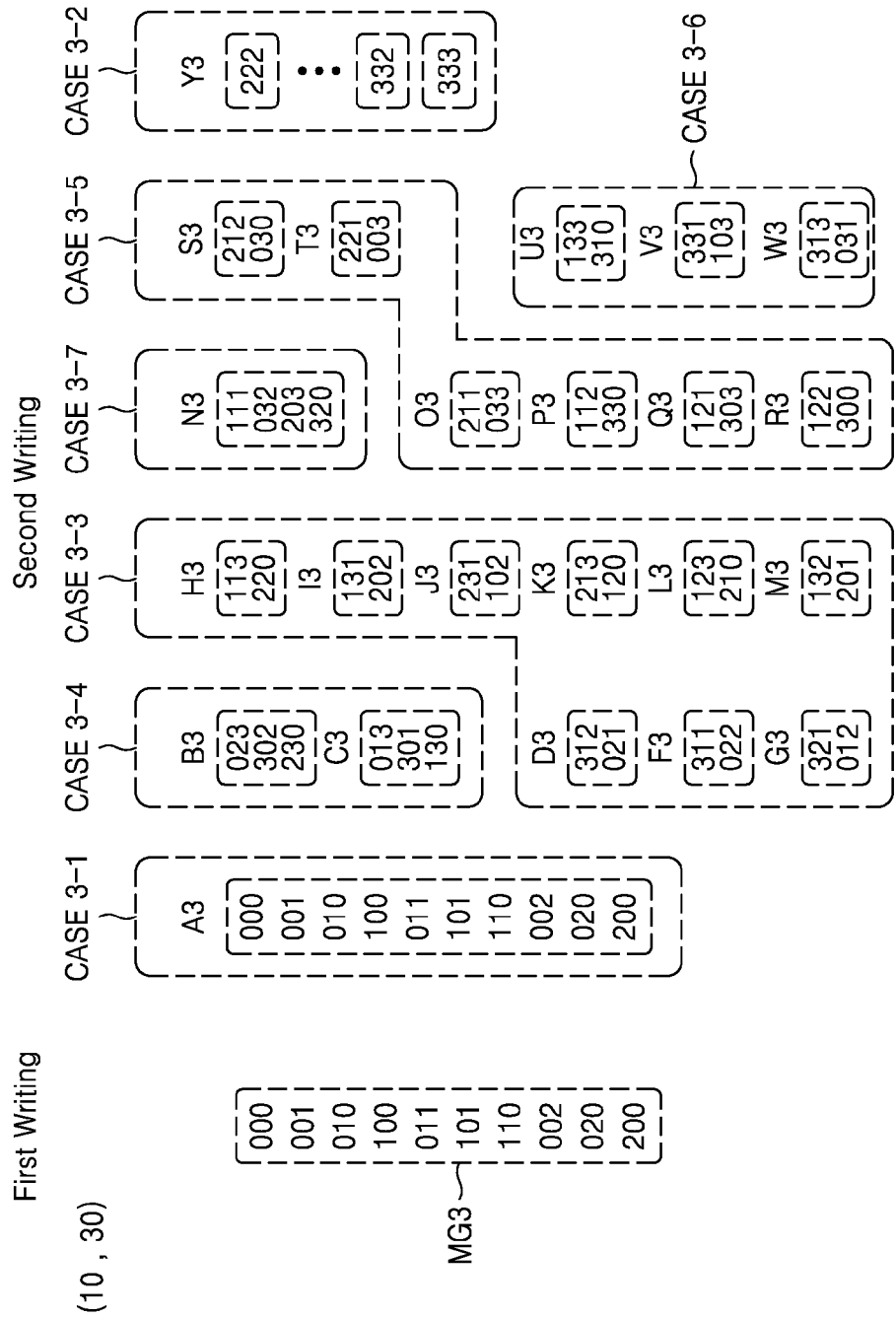
FIG. 13 is a conceptual diagram for explaining a data mapping method according to another embodiment of the inventive concept.

FIG. 13 is a diagram of a plurality of mapping data in second mapping data groups described with reference to FIGS. 7 through 12. As described with reference to FIGS. 7 through 12, in the first writing, one of the 10 mapping data in the first mapping data group MG3 is selected as first mapping data MDATA1 corresponding to first data WDATA1 and the selected first mapping data MDATA1 is programmed to memory area 151-1 corresponding to address ADD1.

In the second writing, one of at least one mapping data in one of the 30 second mapping data groups M1 through M30 is selected as second mapping data MDATA2 based on second data WDATA2, e.g., one of messages A3 through Y3, and first mapping data MDATA1. Memory area 151-1 corresponding to address ADD1 is overwritten with the selected second mapping data MDATA2.

For instance, where second data WDATA2 is message A3, first mapping data MDATA1 programmed to memory area 151-1 is maintained. Where second data WDATA2 is message D3, first mapping data MDATA1 programmed to memory area 151-1 is overwritten with one of mapping data "312" and "021" in the second mapping data group.

Figure 14:
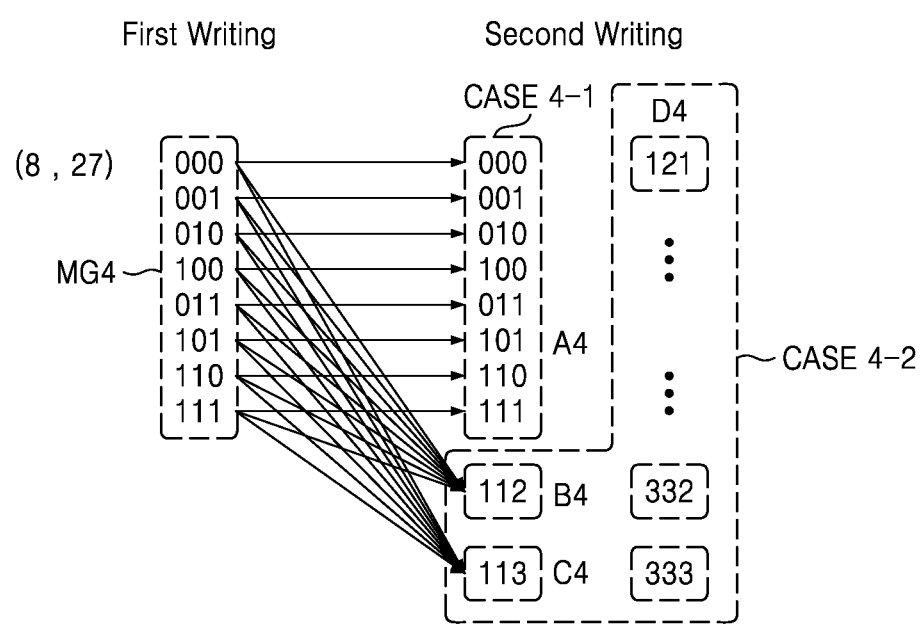
FIG. 14 is a conceptual diagram for explaining a data mapping method according to another embodiment of the inventive concept.

FIG. 14 is a diagram for explaining a fourth mapping algorithm or coding method. channel capacities $R_1$ and $R_2$ are determined by the following equation (7).

$$R_1 = \log_2 m$$

$$R_2 = \log_2(q-m+1) \qquad (7)$$

The number of cases according to the fourth mapping algorithm may be expressed by the following equation (8).

$$<m^n, (q-m+1)^n> \qquad (8)$$

In equation (8), the first term, i.e., "$m^n$" represents the number of mapping data in a first mapping data group MG4 to be used in the first writing and the second term, i.e., "$(q-m+1)^n$" represents the number of second mapping data groups or cases to be used in the second writing. Values used for the mapping data in the first mapping data group MG4 are 0, 1, . . . , (m−1). Therefore, where m=2, a value in the mapping data is 0 or 1. Where n=3 and q=4, <8, 27> is determined according to equation (8).

According to a combination of second data WDATA2 and first mapping data MDATA1, first mapping data MDATA1 programmed to memory area 151-1 may be maintained or overwritten with second mapping data MDATA2. Each of values in second mapping data MDATA2 is one of (m−1), m, . . . , (q−1). For instance, a first mapping data of "111" may be overwritten with a second mapping data of "112" according to second data WDATA2.

In a case 4-1, where second data WDATA2 is a message A4, first mapping data MDATA1 programmed to memory area 151-1 is maintained. In a case 4-2, where second data WDATA2 is a message B4, C4, or D4, first mapping data MDATA1 is overwritten with "112", "113" or "121".

Figure 15:
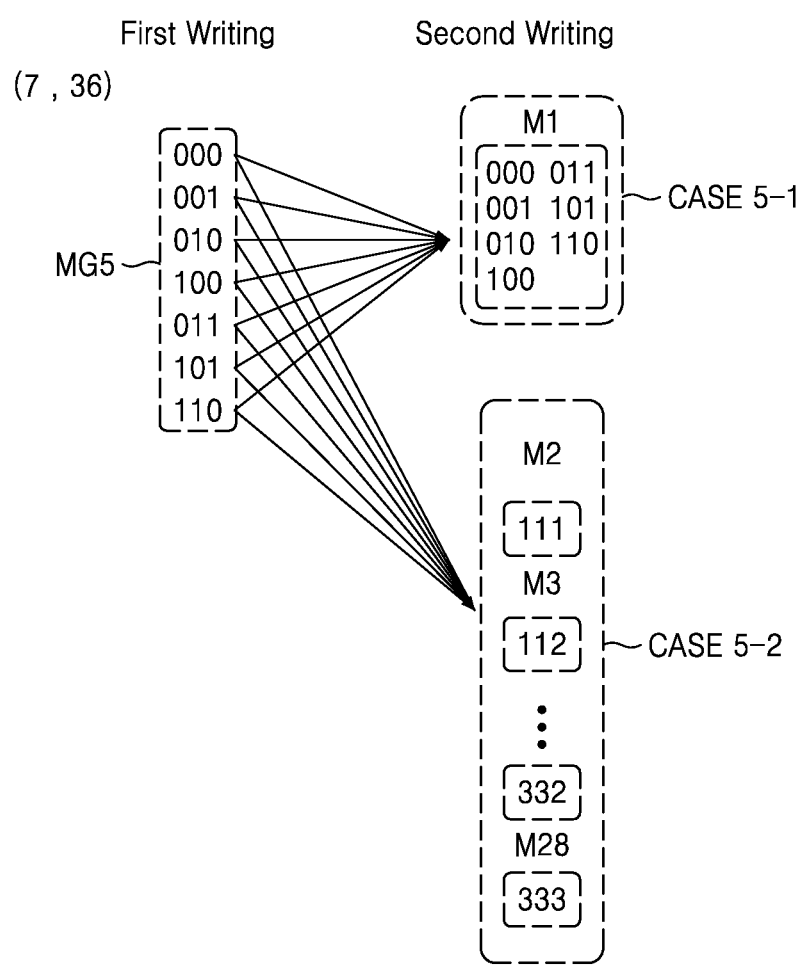
FIG. 15 is a conceptual diagram for explaining a data mapping method according to another embodiment of the inventive concept.
Figure 16:
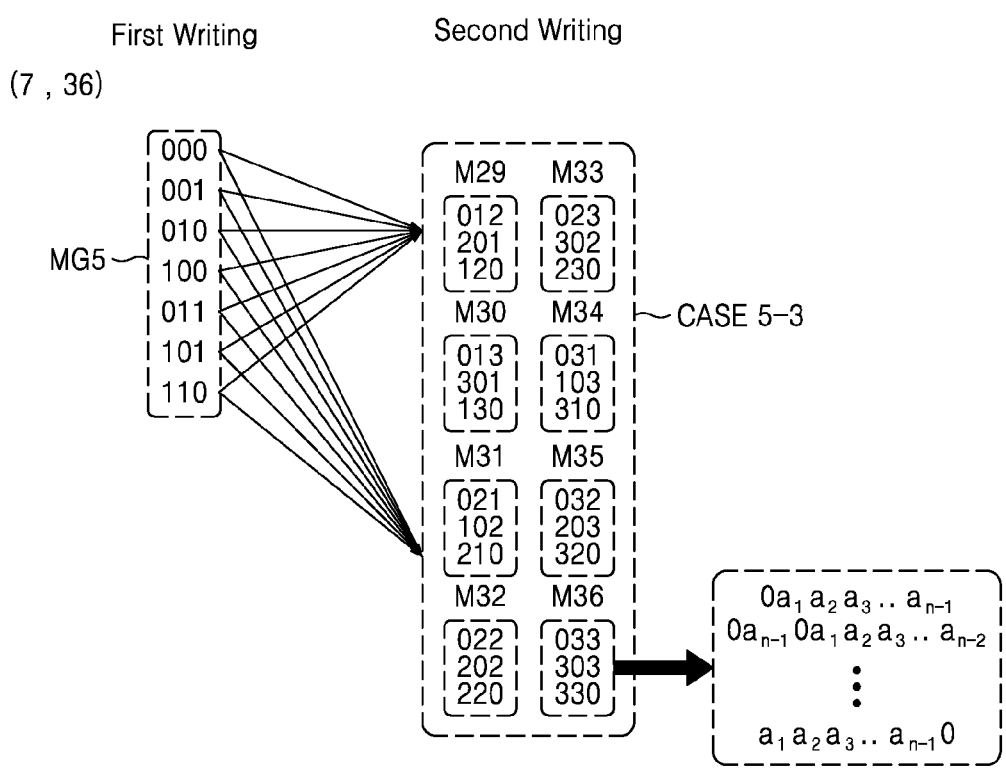
FIG. 16 is a conceptual diagram for explaining a data mapping method according to another embodiment of the inventive concept.

FIGS. 15 and 16 are diagrams for explaining a fifth mapping algorithm or coding method. channel capacities $R_1$ and $R_2$ are determined by the following equation (9).

$$R_1 = \frac{1}{n}\log_2(2^n - 1) \qquad (9)$$

$$R_2 = \frac{1}{n}\log_2 q \times (q-1)^{n-1}$$

The number of cases according to the fifth mapping algorithm may be expressed by the following equation (10).

$$<2^n-1, q(q-1)^{n-1}> \qquad (10)$$

In equation (10), the first term, i.e., "$2^n-1$" represents the number of mapping data in a first mapping data group MG5 to be used in the first writing and the second term, i.e., "$q(q-1)^{n-1}$" represents the number of second mapping data groups or cases to be used in the second writing.

The first mapping data group MG5 includes mapping data "000" in which all values are 0 and mapping data "001", "010", "100", "011", "101", and "110" in which (n−1) values or less are 1 and the remaining values are all 0. Where n=3 and q=4, <7, 36> is determined according to Equation 10. Based on second data WDATA2 and first mapping data MDATA1, first mapping data MDATA1 programmed to memory area 151-1 may be maintained or overwritten with second mapping data MDATA2.

In a case 5-1 illustrated in FIG. 15, first mapping data MDATA1 programmed to memory area 151-1 is maintained based on second data WDATA2 and first mapping data MDATA1. In a case 5-2 illustrated in FIG. 15, 27 second mapping data groups M2 through M28 do not include a value of 0 at all. In a case 5-3 illustrated in FIG. 16, mapping data in each of eight second mapping data groups M29 through M36 includes only one 0 and other values other than 0.

A plurality of mapping data in each of the second mapping data groups M29 through M36 correspond to a mapping data set or a codeword set indicating the same message. The mapping data in each of the second mapping data groups M29 through M36 are generated using bitwise circular shifting.

Figure 17:
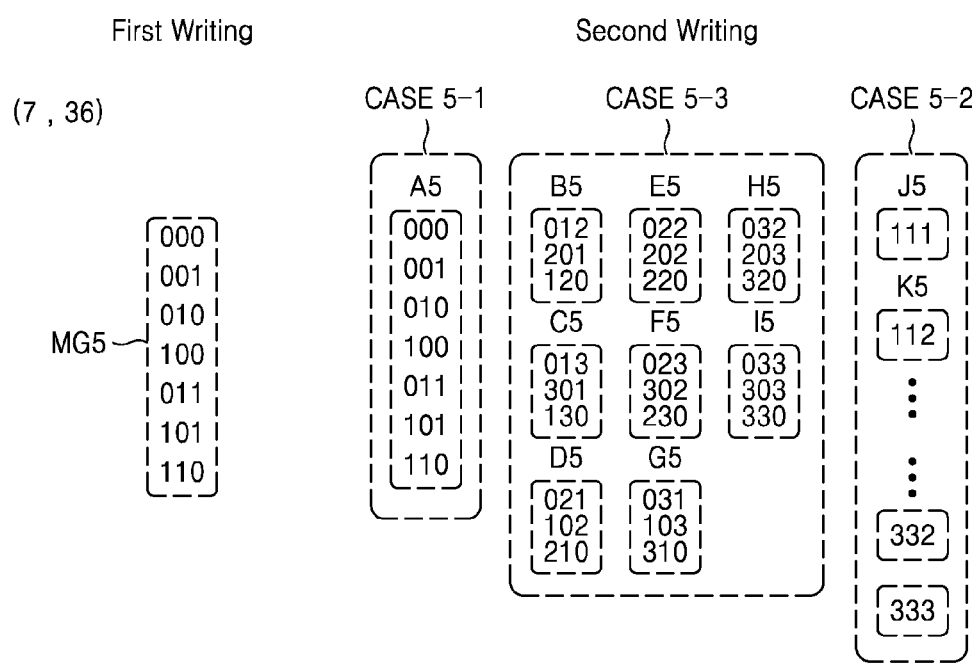
FIG. 17 is a conceptual diagram for explaining a data mapping method according to another embodiment of the inventive concept.

FIG. 17 is a diagram of a plurality of mapping data in second mapping data groups described with reference to FIGS. 15 and 16. As described with reference to FIGS. 15 and 16, in the first writing, one of the 7 mapping data in the first mapping data group MG5 is selected as first mapping data MDATA1 corresponding to first data WDATA1 and the selected first mapping data MDATA1 is programmed to memory area 151-1 corresponding to address ADD1.

In the second writing, one of at least one mapping data in one of the 36 second mapping data groups M1 through M36 is selected as second mapping data MDATA2 based on second data WDATA2, e.g., one of messages A5 through K5, and first mapping data MDATA1. Memory area 151-1 corresponding to address ADD1 is overwritten with the selected second mapping data MDATA2. For instance, where second data WDATA2 is message A5, first mapping data MDATA1 programmed to memory area 151-1 is maintained. Where second data WDATA2 is message J5, first mapping data MDATA1 programmed to memory area 151-1 is overwritten with mapping data "111" in the second mapping data group M2. Where second data WDATA2 is message B5, first mapping data MDATA1 programmed to memory area 151-1 is overwritten with one of mapping data "012", "201", and "120" in the second mapping data group M29.

Figure 18:
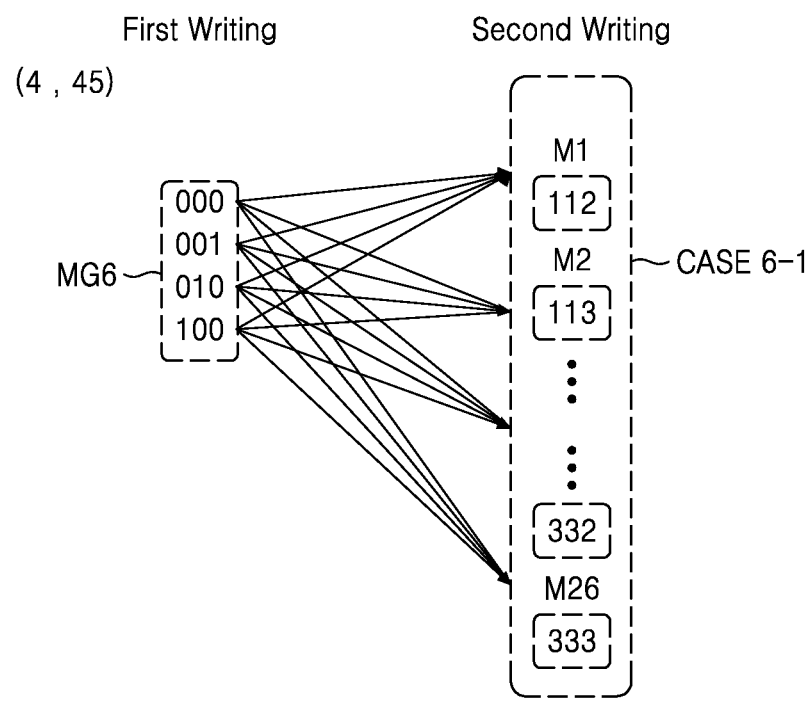
FIG. 18 is a conceptual diagram for explaining a data mapping method according to another embodiment of the inventive concept.
Figure 19:
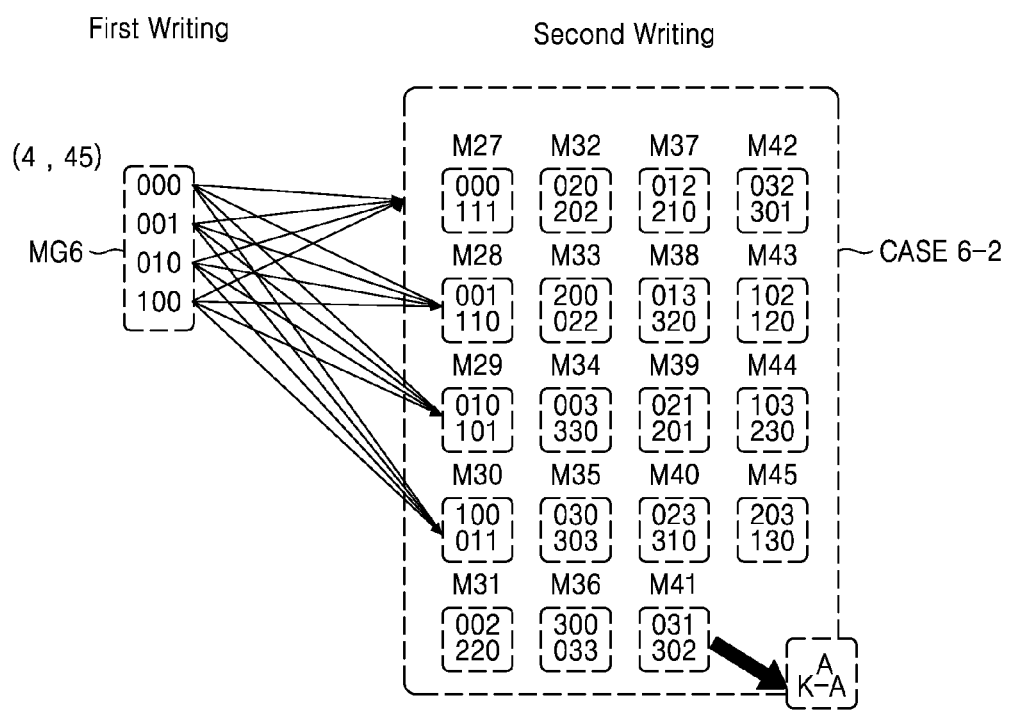
FIG. 19 is a conceptual diagram for explaining a data mapping method according to another embodiment of the inventive concept.

FIGS. 18 and 19 are diagrams for explaining a sixth mapping algorithm or coding method. channel capacities $R_1$ and $R_2$ are determined by the following equation (11).

$$R_1 = \frac{1}{n}\log_2(n+1) \quad (11)$$
$$R_2 = \frac{1}{n}\log_2\{q^n + (q-1)^n - 1\}2^{-1}$$

The number of cases according to the sixth mapping algorithm may be expressed by the following equation (12).

$$<n+1, \{q^n+(q-1)^n-1\}2^{-1}> \quad (12)$$

In equation (12), the first term, i.e., "n+1" represents the number of mapping data in a first mapping data group MG6 to be used in the first writing and the second term, i.e., "$\{q^n+(q-1)^n-1\}2^{-1}$" represents the number of second mapping data groups or cases to be used in the second writing. The first mapping data group MG6 includes mapping data "000" that includes 0 only and mapping data "001", "010", and "100" that include only one 1. Where n=3 and q=4, <4, 45> is determined according to equation (12). One of the four mapping data "000", "001", "010", and "100" is selected as first mapping data MDATA1 corresponding to first data WDATA1.

In a case 6-1 illustrated in FIG. 18, mapping data in each of 26 second mapping data groups M1 through M26 does not include a value of 0 at all. Mapping data "111" having a value of 1 only is not in case 6-1 but is in a case 6-2 illustrated in FIG. 19.

In case 6-2 illustrated in FIG. 19, mapping data A in each of 19 second mapping data groups M27 through M45 includes at least one 0. Each of the second mapping data groups M27 through M45 includes two mapping data A and K–A. Here, mapping data K includes only maximum value among values in corresponding mapping data A. For instance, where mapping data A in the second mapping data group M42 is "032", mapping data K is "333". Therefore, mapping data K–A (=333–032) is "301". However, where mapping data A in the second mapping data group M43 is "102", mapping data K is "222", and therefore, mapping data K–A (=222–102) is "120". A plurality of mapping data in each of the second mapping data groups M27 through M45 correspond to a mapping data set or a codeword set indicating the same message.

Figure 20:
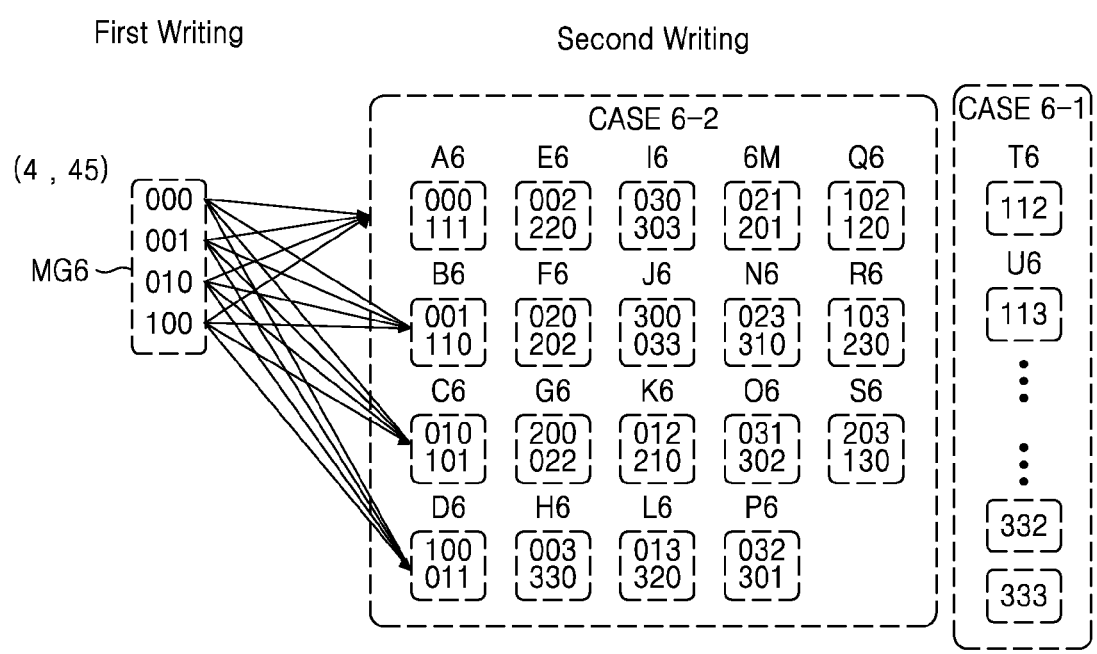
FIG. 20 is a conceptual diagram for explaining a data mapping method according to another embodiment of the inventive concept.

FIG. 20 is a diagram of a plurality of mapping data in second mapping data groups described with reference to FIGS. 18 and 19. As described with reference to FIGS. 18 and 19, in the first writing, one of the 4 mapping data "000", "001", "010", and "100" in the first mapping data group MG6 is selected as first mapping data MDATA1 corresponding to first data WDATA1 and the selected first mapping data MDATA1 is programmed to memory area 151-1 corresponding to address ADD1.

In the second writing, one of at least one mapping data in one of the 45 second mapping data groups M1 through M45 is selected as second mapping data MDATA2 based on second data WDATA2, e.g., one of messages A6 through U6, and first mapping data MDATA1. Memory area 151-1 corresponding to address ADD1 is overwritten with the selected second mapping data MDATA2. For instance, where second data WDATA2 is message A6, first mapping data MDATA1 is overwritten with one of the mapping data "000" and "111" in the second mapping data group M27.

FIG. 21 is a diagram of the channel capacities for a 2-bit MLC in different embodiments of the inventive concept. In detail, FIG. 21 shows channel capacities $R_1$ and $R_2$ and $R_1+R_2$ according to the mapping algorithms described with reference to FIGS. 6 through 20. Referring to FIG. 21, as a mapping algorithm (or coding method) number increases, $R_1$ decreases and $R_2$ increases. However, the mapping algorithm number 4 is independent according to "n", it has no relation with the increase and decrease of channel capacities $R_1$ and $R_2$.

Figure 22:
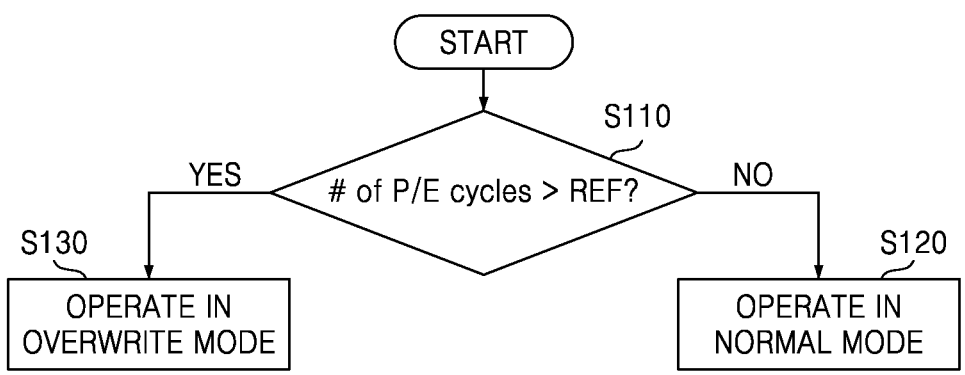
FIG. 22 is a flowchart of a method of operating the system illustrated in FIG. 1 according to an embodiment of the inventive concept.

FIG. 22 is a flowchart of a method of operating system 100 illustrated in FIG. 1 according to an embodiment of the inventive concept.

Referring to FIGS. 1 through 22, system 100 selectively performs a normal mode or an overwrite mode according to information indicating the lifespan of nonvolatile memory device 150. Where new data is programmed to a memory area in the normal mode, nonvolatile memory device 150 erases previous data from the memory area and programs the new data to the memory area. However, in the overwrite mode, nonvolatile memory device 150 overwrites the memory area with the new data without erasing the previous data from the memory area.

The information indicating the lifespan may be the number of program/erase (P/E) cycles, information indicating the threshold voltage distribution of cells, or the number of error corrections performed by ECC engine 143. ECC engine 143 may allocate an ECC code where mapping data MDATA1 or MDATA2 is programmed to nonvolatile memory device 150. ECC engine 143 may correct an error in mapping data MDATA1 or MDATA2 read from nonvolatile memory device 150 using the ECC code.

Where the information indicating the lifespan, e.g., the number of P/E cycles, is less than a reference value REF in operation S110, nonvolatile memory device 150 operates in the normal mode according to the control of memory controller 130 in operation S120. However, where the number of P/E cycles is greater than reference value REF in operation S110, nonvolatile memory device 150 operates in the overwrite mode according to the control of memory controller 130 in operation S130. Where nonvolatile memory device 150 operates in the overwrite mode, the lifespan of nonvolatile memory device 150 can be lengthened.

Figure 23:
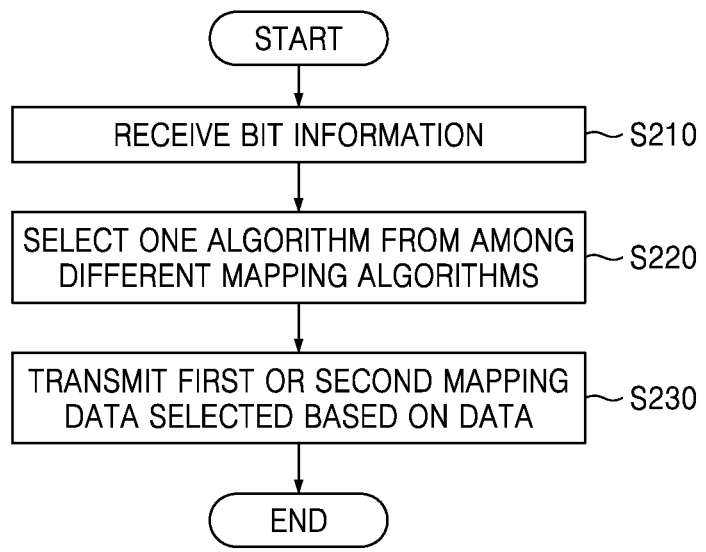
FIG. 23 is a flowchart of a method of operating the system illustrated in FIG. 1 according to another embodiment of the inventive concept.

FIG. 23 is a flowchart of a method of operating system 100 illustrated in FIG. 1 according to other embodiments of the inventive concept. Memory controller 130 may perform at least one of the mapping algorithms described with reference to FIGS. 5 through 20. A program code for performing the at least one algorithm may be stored in program ROM 135. Mapping information according to at least one algorithm may be stored in mapping table 139.

Where memory controller 130 can perform at least two of the mapping algorithms described with reference to FIGS. 5 through 20, host 110 may transmit bit information BI corresponding to channel capacity $R_1$ to host interface 131 of memory controller 130.

Microprocessor 133 receives bit information BI through host interface 131 in operation S210, and it selects one of the at least two mapping algorithms according to bit information BI in operation S220. According to the selected mapping algorithm, microprocessor 133 may transmit first mapping data MDATA1 or second mapping data MDATA2, which is selected based on data WDATA1 or WDATA2, to nonvolatile memory device 150 in operation S230.

Figure 24:
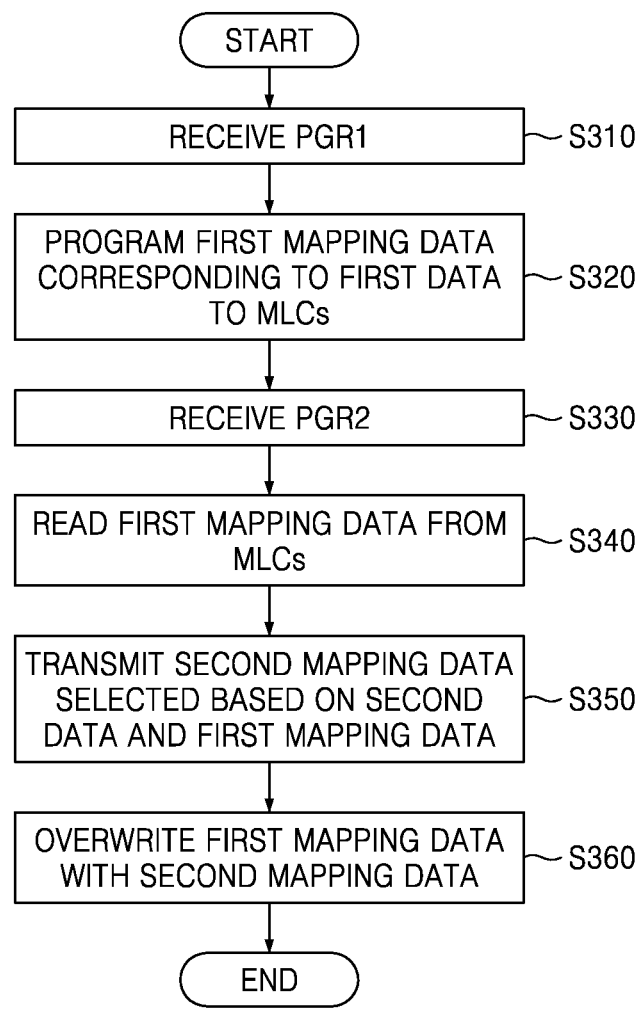
FIG. 24 is a flowchart of data coding method according to an embodiment of the inventive concept.

FIG. 24 is a flowchart of data coding method according to an embodiment of the inventive concept.

Referring to FIGS. 1 and 24, where memory controller 130 receives a first access request PGR1 from host 110 in operation S310, memory controller 130 transmits first mapping data MDATA1 corresponding to first data WDATA1 to nonvolatile memory device 150 based on first access request PGR1 so that first mapping data MDATA1 is programmed to MLCs in memory area 151-1 corresponding to address ADD1 in operation S320. At this time, nonvolatile memory device 150 performs the first writing.

Memory controller 130 receives a second access request PGR2 from host 110 in operation S330 and it reads first mapping data MDATA1 from the MLCs in memory area 151-1 in operation S340. Memory controller 130 transmits second mapping data MDATA2 selected based on second data WDATA2 received from host 110 and first mapping data MDATA1 to nonvolatile memory device 150 in operation S350.

Nonvolatile memory device 150 overwrites first mapping data MDATA1 with second mapping data MDATA2 in memory area 151-1 in operation S360. At this time, nonvolatile memory device 150 performs the second writing.

Figure 25:
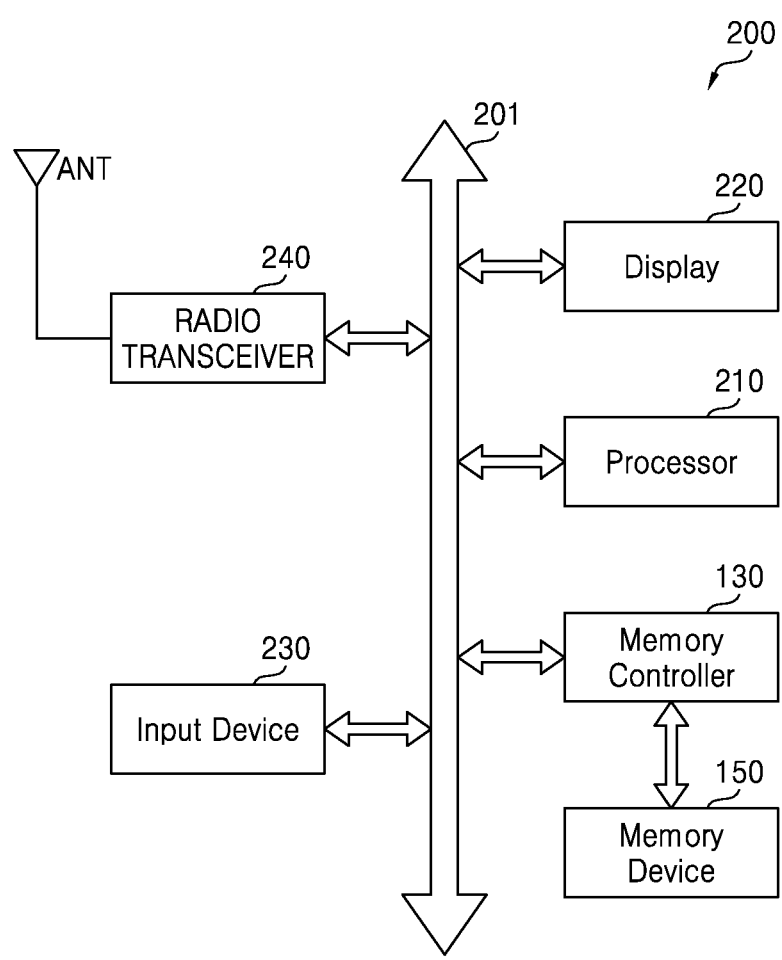
FIG. 25 is a block diagram of a system according to another embodiment of the inventive concept.

FIG. 25 is a block diagram of a system 200 according to an embodiment of the inventive concept.

Referring to FIG. 25, system 200 comprises memory controller 130, nonvolatile memory device 150, and a processor 210. Memory controller 130 may be implemented within processor 210.

According to the control of processor 210, memory controller 130 may control an access operation, e.g., a program operation, an erase operation, a read operation, or an overwrite operation, of nonvolatile memory device 150. Data programmed to nonvolatile memory device 150 may be displayed through a display 220 according to the control of processor 210 and/or memory controller 130.

An input device 230 may enable control signals for controlling the operation of processor 210 or data to be processed by processor 210 to be input to system 200. Input device 230 may be implemented by a pointing device such as a touch pad or a computer mouse, a keypad, or a keyboard. A radio transceiver 240 may transmit or receive radio signals through an antenna ANT. Radio transceiver 240 may convert radio signals received through antenna ANT into signals that can be processed by processor 210.

Accordingly, processor 210 may process the signals output from radio transceiver 240 and transmit the processed signals to memory controller 130 or display 220. Memory controller 130 may program the signals processed by processor 210 to nonvolatile memory device 150. Radio transceiver 240 may also convert signals output from processor 210 into radio signals and output the radio signals to an external device through antenna ANT.

Processor 210 may control the operation of display 220 to display data output from memory controller 130, data output from radio transceiver 240, or data output from input device 230. Components 130, 210, 220, 230, and 240 may communicate with one another through a bus 201.

Figure 26:
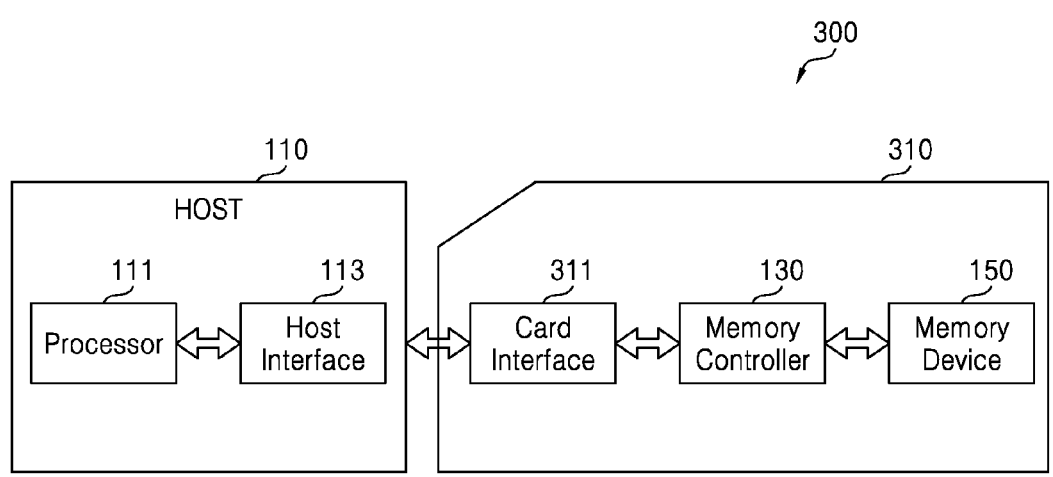
FIG. 26 is a block diagram of a system according to another embodiment of the inventive concept.

FIG. 26 is a block diagram of a system 300 according to another embodiment of the inventive concept. System 300 may be implemented as a memory card or a smart card.

Referring to FIG. 26, system 300 comprises host 110 and a card system 310. Card system 310 comprises memory controller 130, nonvolatile memory device 150, and a card interface 311. Memory controller 130 may control data exchange between nonvolatile memory device 150 and card interface 311. Card interface 311 may be a secure digital (SD) card interface or a multi-media card (MMC) interface, but the inventive concept is not restricted to the current embodiments.

Card interface 311 may interface host 110 and memory controller 130 for data exchange according to a protocol of host 110. Card interface 311 may support a USB protocol and an interchip (IC)-USB protocol. Here, card interface 311 may indicate hardware supporting a protocol used by host 110, software installed in the hardware, or a signal transmission mode.

Where system 310 is connected with host 110, a host interface 113 of host 110 may perform data communication with nonvolatile memory device 150 through card interface 311 and memory controller 130 according to the control of a processor 111. Host 110 may be a PC, a tablet PC, a digital camera, a digital audio player, a cellular phone, smart phone, a console video game hardware, or a digital set-top box. Card system 310 may be implemented as a flash memory drive, a USB memory drive, an IC-USB memory drive, or a memory stick.

Figure 27:
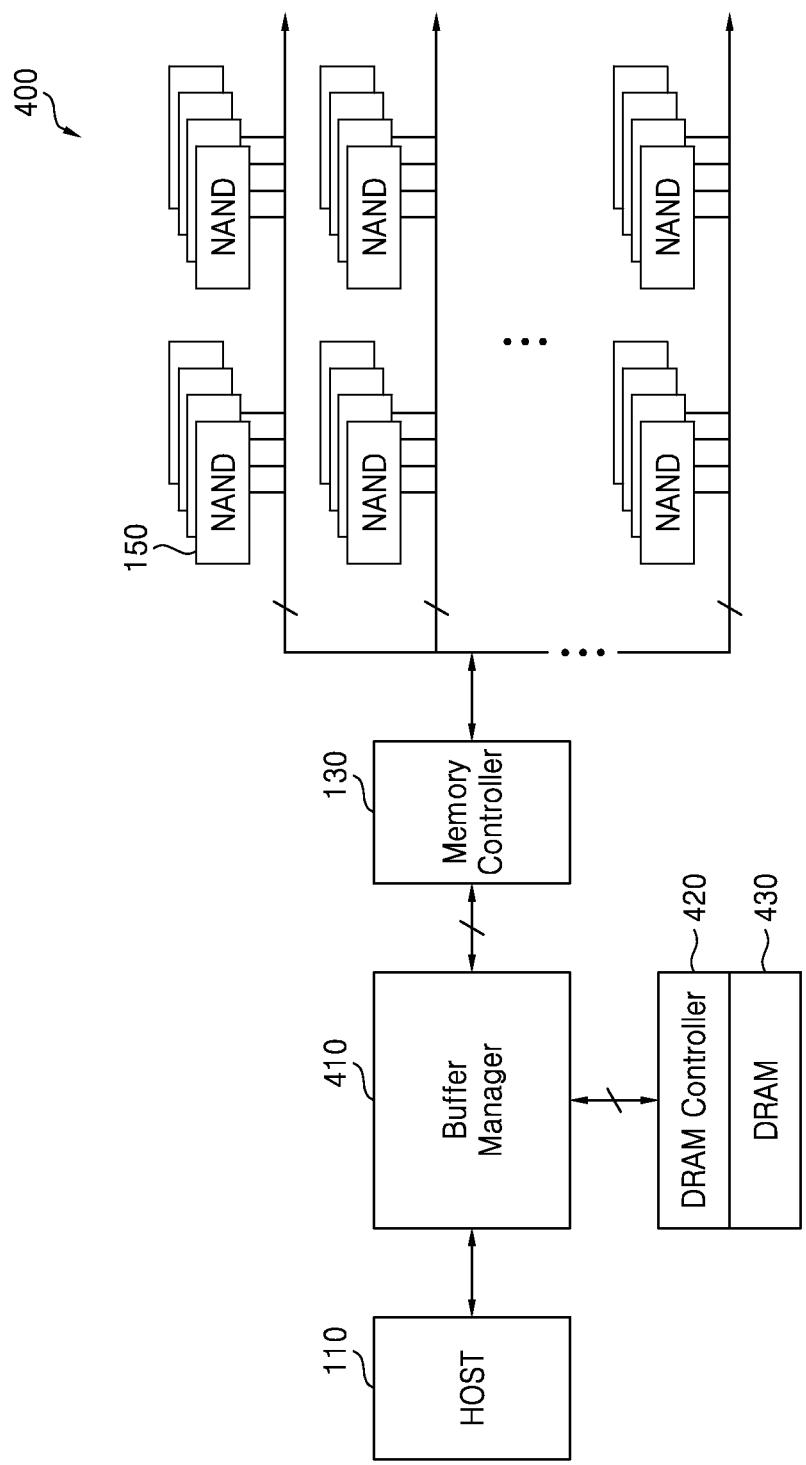
FIG. 27 is a block diagram of a system according to another embodiment of the inventive concept.

FIG. 27 is a block diagram of a system 400 according to other embodiments of the inventive concept.

Referring to FIG. 27, system 400 may be implemented as a data processing system such as a solid state drive (SSD), for instance. System 400 comprises host 110, memory controller 130, a plurality of nonvolatile memory devices, e.g. NAND flash memory devices, 150, a buffer manager 410, a dynamic random access memory (DRAM) controller 420, and a DRAM 430. Memory controller 130 may control the access operation of the nonvolatile memory devices 150.

Buffer manager 410 controls data transfer among host 110, memory controller 130, and DRAM controller 420. DRAM controller 420 may control data transfer between buffer manager 410 and DRAM 430.

As described above, according to some embodiments of the inventive concept, a system programs new data to a memory area, e.g., a page, in a memory block without erasing previous data from the memory area, thereby reducing the number of erase operations on the memory block. As a result, the endurance and/or lifespan of the system is increased. \

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A method of operating a memory controller configured to control operation of a nonvolatile memory device comprising a memory area comprising a plurality of multi-level cells (MLCs), the method comprising:
- receiving, by the memory controller, an address of the memory area and data to be programmed to the memory area;
- analyzing, by the memory controller, access history information regarding the memory area identified by the address, the access history information identifying the number of program operations for the memory area and whether an erase operation was performed on the memory area;
- generating, by the memory controller, either a first mapping data corresponding to only the data based on a first result of the analysis or a second mapping data based on the data and previous mapping data that has been programmed to the MLCs for a second result of the analysis; and
- transmitting, by the memory controller, a program command comprising one of the first mapping data and the second mapping data to the nonvolatile memory device.

2. The method of claim 1, wherein the first mapping data has a different number of bits than the second mapping data.

3. The method of claim 1, further comprising selecting the program command, according to a result of the analysis, from among a command for programming the first mapping data to the MLCs, a command for overwriting the previous mapping data with the second mapping data without erasing the previous mapping data from the MLCs, and a command for erasing the previous mapping data from the MLCs and programming the first mapping data to the MLCs.

4. The method of claim 1, wherein the previous mapping data is read from the MLCs based on the second result of the analysis.

5. The method of claim 1, further comprising selecting an algorithm from among a plurality of different mapping algorithms based on bit information indicating an amount of data to be stored in each of the MLCs, and generating the first mapping data or the second mapping data according to the selected mapping algorithm.

6. The method of claim 5, wherein the selected mapping algorithm is based on dirty paper coding (DPC) theory.

7. The method of claim 1, further comprising comparing a number of program/erase cycles of the MLCs with a reference value, and upon determining that the number of program/erase cycles is greater than the reference value, performing the analyzing, the generating, and the transmitting in sequence.

8. A system comprising:
- a nonvolatile memory device comprising a memory area comprising a plurality of multi-level cells (MLCs) and an access control circuit configured to control access to the memory area; and
- a memory controller configured to receive an address of the memory area and data to be programmed to the memory area, to analyze access history information for the memory area identified by the address, to generate either a first mapping data corresponding to only the data based on a first result of the analysis or a second mapping data based on the data and previous mapping data that has been programmed to the MLCs for a second result of the analysis, and to transmit a program command including one of the first mapping data and the second mapping data to the nonvolatile memory device,
- wherein based on the program command, the access control circuit selectively performs programming the first mapping data to the MLCs, overwriting the previous mapping data with the second mapping data without erasing the previous mapping data from the MLCs, or erasing the previous mapping data and programming the first mapping data to the MLCs;
- wherein the access history information identifies the number of program operations for the memory area and whether an erase operation was performed on the memory area.

9. The system of claim 8, wherein the number of bits in the data used to generate the first mapping data is different from the number of bits in the data used to generate the second mapping data.

10. The system of claim 8, wherein the memory controller comprises:
- a first memory configured to store the access history information;
- a second memory configured to store the first mapping data and the second mapping data; and
- a microprocessor configured to analyze the access history information based on the address, to selectively generate the first mapping data or the second mapping data according to the result of the analysis, and to generate the program command comprising one of the first mapping data and the second mapping data.

11. The system of claim 10, wherein the memory controller further comprises a third memory configured to store program codes for performing different mapping algorithms, and the microprocessor selects an algorithm from among the different mapping algorithms based on bit information indicating an amount of data to be stored in each of the MLCs and selects one of the first mapping data and the second mapping data according to the selected mapping algorithm.

12. The system of claim 11, wherein the selected mapping algorithm is based on dirty paper coding (DPC) theory.

13. The system of claim 8, wherein the system comprises a smart card, a secure digital (SC) card, a multi-media card (MMC), or a flash memory device.

14. The system of claim 8, wherein the system is a solid state drive.

15. A memory controller configured to control operation of a nonvolatile memory device comprising a memory area comprising a plurality of multi-level cells (MLCs), comprising:
- a first interface configured to receive an address of the memory area and data to be programmed to the memory area;
- an analysis unit configured to analyze access history information regarding the memory area identified by the address, the access history information identifying the number of program operations for the memory area and whether an erase operation was performed on the memory area;
- a mapping data generator configured to generate either a first mapping data corresponding to only the data based on a first result of the analysis or a second mapping data based on the data and previous mapping data that has been programmed to the MLCs for a first result of the analysis; and
- a second interface configured to transmit a program command comprising one of the first mapping data and the second mapping data to the nonvolatile memory device.

16. The memory controller of claim 15, wherein the first mapping data has a different number of bits than the second mapping data.

17. The memory controller of claim 15, further comprising a selection unit configured to select the program command, according to a result of the analysis, from among a command for programming the first mapping data to the MLCs, a command for overwriting the previous mapping data with the second mapping data without erasing the previous mapping data from the MLCs, and a command for erasing the previous mapping data from the MLCs and programming the first mapping data to the MLCs.

18. The memory controller of claim 15, wherein the previous mapping data is read from the MLCs based on the second result of the analysis.

19. The memory controller of claim 15, further comprising a selection unit configured to select an algorithm from among a plurality of different mapping algorithms based on bit information indicating an amount of data to be stored in each of the MLCs, and generate the first mapping data or the second mapping data according to the selected mapping algorithm.

20. The memory controller of claim 15, further comprising a comparison unit configured to compare a number of program/erase cycles of the MLCs with a reference value, and upon determining that the number of program/erase cycles is greater than the reference value, performing the analyzing, the generating, and the transmitting in sequence.

* * * * *